(12) United States Patent
Fukushima et al.

(10) Patent No.: US 12,362,384 B2
(45) Date of Patent: Jul. 15, 2025

(54) METHOD FOR PRODUCING SULFIDE SOLID ELECTROLYTE, SULFIDE SOLID ELECTROLYTE, ALL-SOLID-STATE BATTERY, AND METHOD FOR SELECTING RAW MATERIAL COMPOUND FOR USE IN PRODUCING SULFIDE SOLID ELECTROLYTE

(71) Applicant: GS Yuasa International Ltd., Kyoto (JP)

(72) Inventors: Akihiro Fukushima, Kyoto (JP); Katsuya Nishii, Kyoto (JP); Ryo Sakuma, Kyoto (JP); Tadashi Kakeya, Kyoto (JP); Ryuya Ochi, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 1009 days.

(21) Appl. No.: 17/270,762

(22) PCT Filed: Aug. 30, 2019

(86) PCT No.: PCT/JP2019/034139
§ 371 (c)(1),
(2) Date: Feb. 23, 2021

(87) PCT Pub. No.: WO2020/045634
PCT Pub. Date: Mar. 5, 2020

(65) Prior Publication Data
US 2021/0194050 A1 Jun. 24, 2021

(30) Foreign Application Priority Data

Aug. 30, 2018 (JP) .................................. 2018-161831
Dec. 12, 2018 (JP) .................................. 2018-232775
(Continued)

(51) Int. Cl.
*H01M 10/0562* (2010.01)
*C01B 25/14* (2006.01)
*H01M 10/0525* (2010.01)

(52) U.S. Cl.
CPC .......... *H01M 10/0562* (2013.01); *C01B 25/14* (2013.01); *H01M 10/0525* (2013.01); *C01P 2002/74* (2013.01); *H01M 2300/0068* (2013.01)

(58) Field of Classification Search
CPC ......... H01M 10/0562; H01M 10/0525; H01M 2300/0068; H01M 2004/027; H01M 4/13; H01M 4/62; C01B 25/14; C01P 2002/74
See application file for complete search history.

(56) References Cited

U.S. PATENT DOCUMENTS 6,365,300 B1 4/2002 Ota et al.
2007/0042272 A1 2/2007 Ugaji et al.
(Continued)

FOREIGN PATENT DOCUMENTS

JP 2000-340257 A 12/2000
JP 2005-038844 A 2/2005
(Continued)

OTHER PUBLICATIONS

Mizuno et al., "High lithium ion conducting glass-ceramics in the system Li2S—P2S5", ScienceDirect, Elsevier, 2006, Solid State Ionics 177, pp. 2721-2725.
(Continued)

*Primary Examiner* — Eugenia Wang
(74) *Attorney, Agent, or Firm* — RANKIN, HILL & CLARK LLP

(57) ABSTRACT

A method for producing a sulfide solid electrolyte according to an embodiment of the present invention is a method for producing a sulfide solid electrolyte, including: preparing a
(Continued)

composition containing P, S, N, an element A, and an element M; reacting the composition to obtain an intermediate; and heating the intermediate to obtain a sulfide solid electrolyte, where the composition includes a raw material compound containing N, the element A, and the element M. A represents at least one element selected from the group consisting of Li, Na, and K. M represents at least one element selected from the group consisting of Al, Ta, Si, Sc, Mg, Nb, B, Hf, C, P, Zr, and Ti.

4 Claims, 4 Drawing Sheets

(30) Foreign Application Priority Data

| | | |
|---|---|---|
| Mar. 13, 2019 | (JP) | 2019-045347 |
| Jun. 3, 2019 | (JP) | 2019-103611 |

(56) References Cited

U.S. PATENT DOCUMENTS

| | | | |
|---|---|---|---|
| 2014/0141341 | A1 | 5/2014 | Ohtomo et al. |
| 2014/0370398 | A1 | 12/2014 | Lee et al. |
| 2015/0037687 | A1 | 2/2015 | Kanno et al. |
| 2015/0044575 | A1 | 2/2015 | Kawaji et al. |
| 2015/0214572 | A1 | 7/2015 | Kato et al. |
| 2015/0357673 | A1 | 12/2015 | Kanno et al. |
| 2015/0357675 | A1 | 12/2015 | Ohtomo et al. |
| 2016/0133989 | A1 | 5/2016 | Suzuki et al. |
| 2018/0205116 | A1 | 7/2018 | Kanno et al. |
| 2018/0233775 | A1 | 8/2018 | Suzuki et al. |
| 2018/0269527 | A1 | 9/2018 | Minami |
| 2018/0287204 | A1 | 10/2018 | Kanno et al. |
| 2018/0309165 | A1 | 10/2018 | Yersak et al. |
| 2020/0358132 | A1 | 11/2020 | Yamada |
| 2021/0218056 | A1 | 7/2021 | Fukushima et al. |

FOREIGN PATENT DOCUMENTS

| | | |
|---|---|---|
| JP | 2013-016423 A | 1/2013 |
| JP | 2013-177288 A | 9/2013 |
| JP | 2014-60174 A | 4/2014 |
| JP | 2015-011898 A | 1/2015 |
| JP | 2015-035334 A | 2/2015 |
| JP | 5780322 B2 | 9/2015 |
| JP | 5971756 B2 | 8/2016 |
| JP | 2017-168449 | 9/2017 |
| JP | 2017-210393 A | 11/2017 |
| JP | 2018-041671 A | 3/2018 |
| JP | 2018-156735 A | 10/2018 |
| JP | 2018-174130 A | 11/2018 |
| WO | 2018/183365 A1 | 10/2018 |
| WO | 2019/098245 A1 | 5/2019 |

OTHER PUBLICATIONS

Huang et al., "Li3PO4-doped Li7P3S11 glass-ceramic electrolytes with enhanced lithium ion conductivities and application in all-solid-state batteries", Elsevier, 2015, Journal of Power Sources 284, pp. 206-211.

Fukushima et al., "Mechanochemical synthesis of high lithium ion conducting solid electrolytes in a Li2S—P2S5—Li3N system", Elsevier, 2017, Solid State Ionics 304, pp. 85-89.

Zhu et al., "Origin of Outstanding Stability in the Lithium Solid Electrolyte Materials: Insights from Thermodynamic Analyses Based on First-Principles Calculations", ACS Publications, 2015, ACS Appl. Mater. Interfaces 7, pp. 23685-23693.

Ohtomo et al., "All-solid-state lithium secondary batteries using the 75Li2S • 25P2S5 glass and the 70Li2S • 30P2S5 glass-ceramic as solid electrolytes", Elsevier, 2013, Journal of Power Sources 233, pp. 231-235.

Wenzel et al., "Supporting Information for: Direct Observation of the Interfacial In-stability of the Fast Ionic Conductor Li10GeP2S12 at the Lithium Metal Anode", Chem. Mater., 2016, total 3 pages.

Zhu et al., "Strategies Based on Nitride Materials Chemistry to Stabilize Li Metal Anode", Advanced Science News, 2017, Adv. Sci. 4, 1600517, total 11 pages.

Sun et al., "Oxygen substitution effects in Li10GeP2S12 solid electrolyte", Elsevier, 2016, Journal of Power Sources 324, pp. 798-803.

International Search Report (ISR) dated Dec. 3, 2019 filed in PCT/JP2019/034139.

Iio K et al: "Mechanochemical Synthesis of High Lithium Ion Conducting Materials in the System LI3N—SIS2" Chemistry of Materials, American Chemical Society, US, vol. 14, No. 6, Jun. 1, 2002 (Jun. 1, 2002), pp. 2444-2449.

Sakamoto Ryosuke et al: "Preparation of Fast Lithium Ion Conducting Glasses in the System Li2S—SiS2—Li3N", Journal of Physical Chemistry Part B, vol. 103, No. 20, Mar. 2, 1999 (Mar. 2, 1999), pp. 4029-4031.

Hori Satoshi et al: "Phase Diagram of the Li4GeS4—Li3PS4 Quasi-Binary System Containing the Superionic Conductor Li10GeP2S12", Journal of the American Ceramic Society, vol. 98, No. 10, Jul. 8, 2015 (Jul. 8, 2015), pp. 3352-3360.

Yamane H et al: "Preparation and Electrochemical Properties of Double-Metal Nitrides Containing Lithium", Journal of Power Sources, Elsevier SA, CH, vol. 20, No. 3-4, Jul. 1, 1987 (Jul. 1, 1987), pp. 311-315.

METHOD FOR PRODUCING SULFIDE SOLID ELECTROLYTE, SULFIDE SOLID ELECTROLYTE, ALL-SOLID-STATE BATTERY, AND METHOD FOR SELECTING RAW MATERIAL COMPOUND FOR USE IN PRODUCING SULFIDE SOLID ELECTROLYTE

TECHNICAL FIELD

The present invention relates to a method for producing a sulfide solid electrolyte, a sulfide solid electrolyte, an all-solid-state battery, and a method for selecting a raw material compound for use in producing a sulfide solid electrolyte.

Nonaqueous electrolyte secondary batteries typified by lithium-ion nonaqueous electrolyte secondary batteries are, because of the high energy density, heavily used in electronic devices such as personal computers and communication terminals, and automobiles. The nonaqueous electrolyte secondary battery typically including an electrode assembly with a pair of electrically isolated electrodes and a nonaqueous electrolyte interposed between the electrodes is configured for charge-discharge through ion transfer between the both electrodes.

In recent years, sulfide solid electrolytes have been attracting attention as nonaqueous electrolytes for nonaqueous electrolyte secondary batteries, and have been researched variously.

Patent Document 1 mentions the production of a sulfide solid electrolyte that has a composition of $75Li_2S-25P_2S_5-yLi_3N$ with $Li_2S$, $P_2S_5$, and $Li_3N$ as starting materials.

Patent Document 2 mentions the production of a sulfide solid electrolyte with the use of a raw material composition composed of $Li_2S$, $P_2S_5$, LiBr, LiI, and $Li_3N$.

PRIOR ART DOCUMENTS

Patent Documents

Patent Document 1: JP-A-2018-041671
Patent Document 2: JP-A-2015-011898
Patent Document 3: JP-A-2018-156735

SUMMARY OF THE INVENTION

Problems to be Solved by the Invention

Patent Document 1 mentions that the sulfide solid electrolyte contains N, thereby making it possible to improve the atmospheric stability (water resistance) of the sulfide solid electrolyte. The use of $Li_3N$ as a raw material for the sulfide solid electrolyte has, however, the problem of N discharged to the outside of the system.

Patent Document 2 mentions that a raw material composition containing $Li_2S$, $P_2S_5$, LiI, and LiBr is made amorphous and then subjected to a heat treatment to precipitate a high Li-ion conductive phase. The excessively high heat treatment temperature has, however, the problem of precipitating a low Li-ion conductive phase.

Patent Document 3 mentions that the addition of $Li_3N$ can increase the difference between the temperature at which a high Li-ion conductive phase is produced and the temperature at which a low Li-ion conductive phase is produced, but the difference is as small as approximately 30° C. at a maximum, and further improvements have been required.

The present invention has been made based on the above-described circumstances, and an object of an aspect of the present invention is to provide a method for producing a sulfide solid electrolyte, a method for selecting a raw material compound for use in producing a sulfide solid electrolyte, and an all-solid-state battery including the sulfide solid electrolyte, which are capable of suppressing the discharge of N to the outside of the system in the process of producing the sulfide solid electrolyte.

An object of another aspect of the present invention is to obtain a sulfide solid electrolyte with thermal stability improved, and provide a method for producing the sulfide solid electrolyte, and an all-solid-state battery including the sulfide solid electrolyte.

MEANS FOR SOLVING THE PROBLEMS

An aspect of the present invention made to solve the above problems is a method for producing a sulfide solid electrolyte, including: preparing a composition containing P, S, N, an element A, and an element M; reacting the composition to obtain an intermediate; and heating the intermediate to obtain a sulfide solid electrolyte, where the composition includes a raw material compound containing N, the element A, and the element M. A represents at least one element selected from the group consisting of Li, Na, and K. M represents at least one element selected from the group consisting of Al, Ta, Si, Sc, Mg, Nb, B, Hf, C, P, Zr, and Ti.

Another aspect of the present invention is a method for selecting a raw material compound for use in producing a sulfide solid electrolyte, including: selecting a candidate material containing N, an element A', and an element M' as a candidate for the raw material compound; and calculating defect generation energy $E_{Ndefect}$ of N inside the candidate material with the use of the first principle calculation, where the candidate material is selected as the raw material compound when the $E_{Ndefect}$ is 4.00 eV or more.

Another aspect of the present invention is a sulfide solid electrolyte that contains P, 5, N, an element A, an element X, and an element M as constituent elements and that has a crystalline structure. In this regard, A represents at least one element selected from the group consisting of Li, Na, and K. X represents at least one element selected from the group consisting of Cl, Br, and I. M represents at least one element selected from the group consisting of Al, Ta, Si, Sc, Mg, Nb, B, Hf, C, P, Zr, and Ti.

Advantages of the Invention

The method for producing a sulfide solid electrolyte, the method for selecting a raw material compound for use in producing a sulfide solid electrolyte, and the sulfide solid electrolyte according to an aspect of the present invention are capable of suppressing the discharge of N to the outside of the system in the process of producing the sulfide solid electrolyte.

The sulfide solid electrolyte according to another aspect of the present invention can provide a sulfide solid electrolyte with thermal stability improved.

MODE FOR CARRYING OUT THE INVENTION

Figure 1:
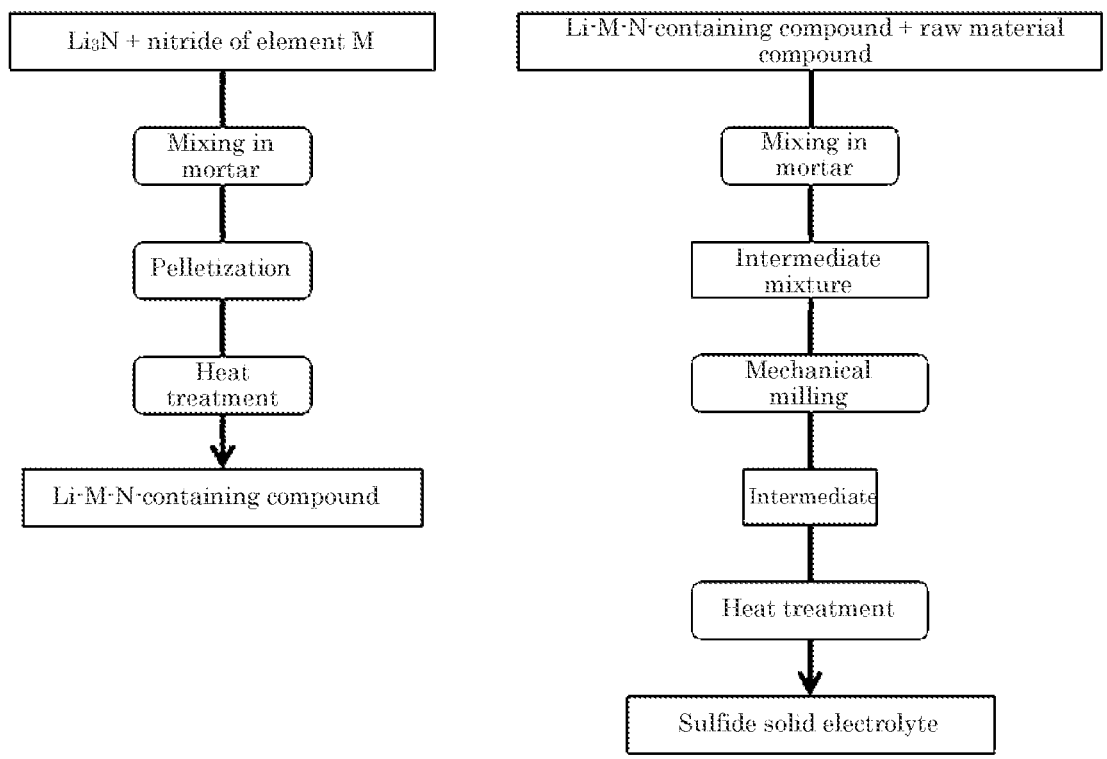
FIG. 1 is a flowchart of a process of producing a sulfide solid electrolyte according to an embodiment of the present invention.

First an outline will be described for a method for producing a sulfide solid electrolyte, disclosed by this specification.

A method for producing a sulfide solid electrolyte according to an aspect of the present invention is a method for producing a sulfide solid electrolyte, including: preparing a composition containing P, S, N, an element A, and an element M; reacting the composition to obtain an intermediate; and heating the intermediate to obtain a sulfide solid electrolyte, where the composition includes a raw material compound containing N, the element A, and the element M. In this regard, A represents at least one element selected from the group consisting of Li, Na, and K. M represents at least one element selected from the group consisting of Al, Ta, Si, Sc, Mg, Nb, B, Hf, C, P, Zr, and Ti.

In the present invention, the "composition" means a mixture obtained by mixing two or more compounds. The "raw material compound" means a specific compound constituting the above composition.

The inventors have found that the use of a raw material compound containing: at least one element A selected from the group consisting of Li, Na, and K; at least one element M selected from the group consisting of Al, Ta, Si, Sc, Mg, Nb, B, Hf, C, P, Zr, and Ti; and N can suppress the discharge of N to the outside of the system in the process of producing a sulfide solid electrolyte, thereby achieving the present invention.

The method for producing the sulfide solid electrolyte is capable of suppressing the discharge of N to the outside of the system in the process of producing the sulfide solid electrolyte. For this reason, the content of N contained in the sulfide solid electrolyte is easily controlled. The reason therefor is not clear, but the following reason is presumed.

In the methods for producing sulfide solid electrolytes with the use of $Li_3N$, disclosed in Patent Document 1 and Patent Document 3, the defect generation energy of N of $Li_3N$ is low, thereby making an $N_2$ gas likely to be generated.

In contrast, in the method for producing the sulfide solid electrolyte with the use of the raw material compound containing N, the element A, and the element M, the defect generation energy of N is high, thereby making defects of N unlikely to be generated in the process of synthesizing the sulfide solid electrolyte, and thus making an $N_2$ gas unlikely to be generated. Thus, the discharge of N to the outside of the system can be suppressed in the process of producing the sulfide solid electrolyte.

It is to be noted that the element M refers to an element such that the defect generation energy of N ire a compound represented by $Li_\alpha M_\beta$ ($\alpha$ and $\beta$ represent numerical values that provide stoichiometric ratios depending on the type of element M), calculated by the first principle calculation described later, is 4.00 eV or more. The definition of the defect generation energy of N will be described later.

The raw material compound containing N, the element A, and the element M preferably contains Li, N, the element A, and the element M.

This makes it possible to increase the gravimetric energy density of an all-solid-state battery including the sulfide solid electrolyte produced by the production method. This is because Li has the smallest atomic weight among alkali metal elements and also has a small ionic size.

The raw material compound containing N, the element A, and the element M may be obtained by reacting a nitride of the element M and a nitride of the element A, or an industrially manufactured and sold compound may be used.

The element M is preferably one element selected from the group consisting of Al, Ta, Si, Sc, Mg, Nb, B, Hf, C, and P. These elements are elements such that the defect generation energy of N calculated by the first principle calculation described later is 4.10 eV or more.

Thus, the discharge of N to the outside of the system can be more reliably suppressed in the process of producing the sulfide solid electrolyte.

The element M is more preferably at least one element selected from the group consisting of Al, Ta, Si, Sc, Mg, Nb, and B. These elements are elements such that the defect generation energy of N calculated by the first principle calculation described later is 4.35 eV or more.

Thus, the discharge of N to the outside of the system can be further reliably suppressed in the process of producing the sulfide solid electrolyte.

The composition preferably includes a raw material compound containing a lithium sulfide and a phosphorus sulfide, and the above-mentioned N, element A, and element M. These compounds are easy to handle, thus allowing the manufacturability of the sulfide solid electrolyte to be enhanced.

In the above-mentioned composition, preferably, the element A contains Li, the content ratio of Li to P in the composition is 2.30 or more and 4.20 or less in terms of mole ratio, and the content ratio of N to P in the composition is 0.0100 or more and 1.20 or less in terms of mole ratio. Further, more preferably, the element A contains Li, the content ratio of Li to P in the composition is 2.77 or more and 3.38 or less in terms of mole ratio, and the content ratio of N to P in the composition is 0.280 or more and 0.650 or less in terms of mole ratio. This makes it possible to provide a sulfide solid electrolyte that has excellent atmospheric stability and high ion conductivity at 25° C.

The composition preferably contains an element X. X is at least one element selected from the group consisting of Cl, Br, and I.

It is known that a sulfide solid electrolyte containing Li, P, S, and the element X produces a metastable phase with a high ion conductivity (hereinafter, also referred to as an HICP (High Ion. Conduction Phase)) (Patent Document 2). In addition, it is known that such a sulfide solid electrolyte contains N, thereby increasing the difference between the heat treatment; temperature at which an HICP is precipitated and the heat; treatment temperature at which the HICP undergoes a phase transition to another phase with a low ion conductivity (hereinafter, also referred to as a LICP (Low Ion Conduction Phase)) (Patent Document 3). In Patent Document 3, however, because the sulfide solid electrolyte is produced with the use of $Li_3N$, N is discharged to the outside of the system in the process of producing the sulfide solid electrolyte, and the effect of the HICP expanding the stable heat treatment temperature range fails to be achieved sufficiently.

In contrast, the method for producing the sulfide solid electrolyte suppresses the discharge of N to the outside of the system. For this reason, the effect of improving the thermal stability of the HICP can be sufficiently produced.

As for the above-mentioned composition, preferably, the content ratio of Li to P in the composition is 3.10 or more and 4.20 or less in terms of mole ratio, the content ratio of N to P in the composition is 0.0600 or more and 0.750 or less in terms of mole ratio, and the content ratio of X to P in the composition is 0.180 or more and 1.30 or less in terms of mole ratio.

This makes it possible to provide a sulfide solid electrolyte in which an HICP has high thermal stability.

A sulfide solid electrolyte according to another aspect of the present invention is a sulfide solid electrolyte produced by the method for producing the sulfide solid electrolyte. Such a sulfide solid electrolyte suppresses the discharge of N to the outside of the system in the process of producing the sulfide solid electrolyte, thus allowing various effects of containing N to be produced sufficiently.

An all-solid-state battery according to another aspect of the present invention includes a sulfide solid electrolyte produced by the method for producing the sulfide solid electrolyte. Such an all-solid-state battery suppresses the discharge of N to the outside of the system in the process of producing the sulfide solid electrolyte, thus allowing various effects of containing N to be produced sufficiently.

A method for selecting a raw material compound for use in producing a sulfide solid electrolyte according to another aspect of the present invention is a method for selecting a raw material compound for use in producing a sulfide solid electrolyte, including: selecting a candidate material containing N, an element A', and an element M' as a candidate for the raw material compound; and calculating defect generation energy $E_{Ndefect}$ of N inside the candidate material with the use of the first principle calculation, where the candidate material is selected as the raw material compound when the $E_{Ndefect}$ is 4.00 eV or more.

It is to be noted that in the case where there are multiple N-occupied sites in the crystalline structure of the candidate material, the $E_{Ndefect}$ is calculated for each N-occupied site, and the $E_{Ndefect}$ that has the lowest value is used as the $E_{Ndefect}$ of the candidate material.

The raw material compound selected by the selection method is high in N defect generation energy and unlikely to generate N defects in the process of synthesizing the sulfide solid electrolyte, and thus unlikely to generate an $N_2$ gas. For this reason, the production of a sulfide solid electrolyte with the use of the above-mentioned raw material compound makes it possible to suppress the discharge of N to the outside of the system in the process of producing the sulfide solid electrolyte.

In the case where the $E_{Ndefect}$ is 4.10 eV or more, it is preferable to select the candidate material as the raw material compound.

Thus, the discharge of N to the outside of the system can be more reliably suppressed in the process of producing the sulfide solid electrolyte.

In the case where the $E_{Ndefect}$ is 4.35 eV or more, it is more preferable to select the candidate material as the raw material compound.

Thus, the discharge of N to the outside of the system can be further reliably suppressed in the process of producing the sulfide solid electrolyte.

A method for producing a sulfide solid electrolyte according to another aspect of the present invention is a method for producing a sulfide solid electrolyte, including: preparing a composition including a raw material compound selected by the method for selecting a raw material compound for use in producing the sulfide solid electrolyte; reacting the composition to obtain an intermediate; and heating the intermediate to obtain the sulfide solid electrolyte.

Thus, the discharge of N to the outside of the system can be suppressed in the process of producing the sulfide solid electrolyte. For this reason, the content of N contained in the sulfide solid electrolyte is easily controlled.

A sulfide solid electrolyte according to another aspect of the present invention is a sulfide solid electrolyte produced by the production method. Such a sulfide solid electrolyte suppresses the discharge of N to the outside of the system in the process of producing the sulfide solid electrolyte, thus allowing various effects of containing N to be produced sufficiently.

An all-solid-state battery according to another aspect of the present invention includes a sulfide solid electrolyte produced with the use of the raw material compound selected by the selection method. Such a sulfide solid electrolyte suppresses the discharge of N to the outside of the system in the process of the production, thus allowing various effects of containing N to be produced sufficiently.

A sulfide solid electrolyte according to another aspect of the present invention is a sulfide solid electrolyte that contains P, S, N, an element A, an element X, and an element M as constituent elements and that has a crystalline structure. In this regard, A represents at least one element selected from the group consisting of Li, Na, and K. X represents at least one element selected from the group consisting of Cl, Br, and I. M represents at least one element selected from the group consisting of Al, Ta, Si, Sc, Mg, Nb, B, Hf, C, P, Zr, and Ti.

Such a sulfide solid electrolyte is capable of enhancing the thermal stability of the HICP, as compared with a sulfide solid electrolyte composed of only Li, P, S, N, and the element X.

The element M is preferably at least one element selected from the group consisting of Al, Ta, Si, Sc, Mg, Nb, and B.

This allows the thermal stability of the HICP to be further enhanced.

The crystalline structure preferably has diffraction peaks at $2\theta=20.2°\pm0.5°$ and $23.6°\pm0.5°$ in X-ray diffraction measurement with a CuKα line.

The sulfide solid electrolyte has the crystalline structure mentioned above, thereby providing a favorable Li ion conductivity.

An all-solid-state battery according to another aspect of the present invention is all-solid-state battery including a sulfide solid electrolyte that contains P, S, N, an element A, an element X, and an element M as constituent elements and that has a crystalline structure.

One of the advantages of all-solid-state batteries over nonaqueous electrolyte solution batteries is that the operating temperatures have extremely high upper limits. This advantage is achieved because of the high thermal stability of the solid electrolyte.

Patent Documents 2 and 3 mentions, however, that the sulfide solid electrolytes containing Li, P, S, N, Br, and I has a high Li-ion conductive phase that undergoes a phase transition to a low Li-ion conductive phase when the heating temperature is increased. More specifically, the operating temperature of the all-solid-state battery including such a sulfide solid electrolyte is limited by the phase transition temperature of the high Li-ion conductive phase.

In contrast, the sulfide solid electrolyte is higher in the thermal stability of the HICP than conventional sulfide solid electrolyte containing no element M. For this reason, the all-solid-state battery including the sulfide solid electrolyte according to the present invention can fully enjoy the advantage of the all-solid-state battery that allows the raised upper limit of the operating temperature of the battery.

A sulfide solid electrolyte according to another aspect of the present invention is a sulfide solid electrolyte that contains P, S, N, an element A, and an element M and has crystallinity. In this regard, A represents at least one element selected from the group consisting of Li, Na, and K. M represents at least one element selected from the group consisting of Al, Ta, Si, Sc, Mg, Nb, B, Hf, C, P, Zr, and Ti.

Such a sulfide solid electrolyte suppresses the discharge of N to the outside of the system in the process of producing the sulfide solid electrolyte, thereby allowing the atmospheric stability and the like to be enhanced.

The element M is preferably at least one element selected from the group consisting of Al, Ta, Si, Sc, Mg, Nb, and B.

Thus, the discharge of N to the outside of the system is more reliably suppressed in the process of producing the sulfide solid electrolyte, thereby allowing the atmospheric stability and the like to be enhanced.

Hereinafter, a method for producing a sulfide solid electrolyte, a sulfide solid electrolyte, an all-solid-state battery, and a method for selecting a method for selecting a raw material compound for use in producing a sulfide solid electrolyte according to an embodiment of the present invention will be described in detail. It is to be noted that matters other than the matters specifically mentioned in this specification, which are necessary for carrying out the present invention, can be understood as design matters of those skilled in the art based on the prior art in the art. The present invention can be carried out based on what is disclosed in this specification and technical common knowledge in the art.

<Method of for Producing Sulfide Solid Electrolyte>

Embodiment

A method for producing a sulfide solid electrolyte according to an embodiment of the present invention includes: a preparation step of preparing a composition containing P, S, N, an element A, and an element M; a reaction step of reacting the composition to obtain an intermediate; and a heating step of heating the intermediate to obtain a sulfide solid electrolyte, and the composition includes a raw material compound containing N, the element A, and the element M. In this regard, A is at least one element selected from the group consisting of Li, N a, and K. M is at least one element selected from the group consisting of Al, Ta, Si, Sc, Mg, Nb, B, Hf, C, P, Zr, and Ti.

In the present embodiment, the method for producing a sulfide solid electrolyte will be described with reference to, as an example, a case of containing Li as the element A. FIG. 1 is a flowchart showing an example of a method for producing a sulfide solid electrolyte according to the present embodiment, which will be described below in accordance with the flowchart.

(Preparation Step)

In this step, a composition containing Li, P, S, N, and element M is prepared.

The above-mentioned composition is preferably a mixture of one or more raw material compounds containing N, Li, and the element M (hereinafter, also referred to as Li-M-N-containing compounds) and one or more raw material compounds containing Li, P, and S.

In FIG. 1, first, $Li_3N$ and a nitride of the element M are prepared and mixed in a mortar or the like. Next, a pellet of the mixed raw material compounds is produced. Next, the above-mentioned pellet is subjected to a heat treatment to produce a Li-M-N-containing compound.

It is to be noted that the means for preparing the Li-M-N-containing compound is not limited thereto, and the Li-M-N-containing compound may be prepared by other methods. For example, the raw materials for the Li M-N-containing compound may be two or more compounds containing any of N, Li, and the element M. The Li-M-N-containing compound may be prepared by mechanical milling. As the M-N-containing compound, an industrially manufactured and sold compound may be prepared.

As the Li-M-N-containing compound, a lithium composite nitride of the element M is suitably used. Examples of the lithium composite nitride of the element M include lithium composite nitrides such as $Li_{3/2}Al_{1/2}N$, $Li_{3/2}Bi_{1/2}N$, $Li_{5/3}Si_{1/3}N$ $Li_{9/5}Si_{3/10}N$, $Li_{7/4}P_{1/4}N$, $LiMgN$, $LiHf_{1/2}N$, $Li_{3/2}Sc_{1/2}N$, $LiZr_{1/2}N$, $Li_{5/3}Ti_{1/3}N$, $Li_{4/3}Ta_{1/3}N$, $Li_{7/4}Ta_{1/4}N$, $Li_{7/4}Nb_{1/4}N$, and $LiC_{1/2}N$. Among these nitrides, $Li_{3/2}Al_{1/2}N$, $Li_{3/2}B_{1/2}N$, and $Li_{5/3}Si_{1/3}N$ are preferable because of the easy availability. Further, $Li_{3/2}Al_{1/2}N$ is particularly preferable from the viewpoint of suppressing the precipitation of $Li_2S$, and $Li_{3/2}B_{1/2}N$ and $Li_{5/3}Si_{1/3}N$ are particularly preferable from the viewpoint of improving the thermal stability of the HICP. $Li_{3/2}Al_{1/2}N$ and $Li_{3/2}B_{1/2}N$ are particularly preferable from the viewpoint of suppressing the discharge of N to the outside of the system in the process of producing the sulfide solid electrolyte.

Examples of the raw material compound containing the element M include an oxide of the element M, a sulfide of the element M, a nitride of the element M, and an alloy of the element M and Li. Examples of the sulfide of the element M include $Al_2S_3$ and $SiS_2$. Examples of the nitride of the element M include $AlN$, $Si_3N_4$, $BN$, and $Mg_3N_2$. For the raw material compound containing the element M, one compound may be used alone, or two or more compounds may be used in mixture.

The element M in the production method is not particularly limited as long as the element M is at least one element selected from the group consisting of Al, Ta, Si, Se, Mg, Nb, B, Hf, C, P, Zr, and Ti. Among these elements, the element M is preferably any of Al, Ta, Si, Sc, Mg, Nb, B, Hf, C, and P, more preferably any of Ta, Si, Sc, Mg, Nb, and B, from the viewpoint of more reliably suppressing the discharge of N to the outside of the system in the process of producing the sulfide solid electrolyte. The element M is further preferably any of Al, Si, and B because of easily available. In particular, the element M may be Al.

Examples of the raw material compound containing N include $Li_3N$, $PN$, $P_3N_5$, $S_4N_4$, $S_2N_2$, and $S_4N_2$. Among these compounds, $Li_3N$ is preferable. For the raw material compound containing N, one compound may be used alone, or two or more compounds may be used in mixture.

Examples of the raw material compound containing Li (also referred to as a Li compound) include $Li_2S$, $Li_2O$, $Li_3N$, $Li_2CO_3$, and metallic lithium. Among these compounds, $Li_2S$ is preferable. For the raw material compound containing Li, one compound may be used alone, or two or more compounds may be mixed and used.

Examples of the raw material compound containing P (also referred to as a P compound) include $P_2S_3$, $P_2S_5$, $P_2O_5$, $P_3N_5$, and elemental phosphorus. Among these compounds, $P_2S_3$ and $P_2S_5$ are preferable, and $P_2S_5$ is particularly preferable. For the raw material compound containing P, one compound may be used alone, or two or more compounds may be used in mixture.

Examples of the raw material compound obtaining S include $Li_2S$, $P_2S_3$, $P_2S_5$, sulfides of the element M, and elemental sulfur. For the raw material compound containing S, one compound may be used alone, or two or more compounds may be mixed and used.

The above-mentioned composition preferably includes the Li compound, the P compound, and the Li-M-N-containing compound, and at least one of the Li compound and the P compound more preferably contains S. A lithium sulfide, a phosphorus sulfide, and a compound represented by the general formula $Li_\alpha M_\beta N$ ($\alpha$ and $\beta$ represent numerical values that provide stoichiometric ratios depending on the type of the element M) are further preferably contained as the Li compound, the P compound, and the Li-M-N-containing compound.

The sulfide solid electrolyte may possibly have atmospheric stability decreased because of the precipitation of $Li_2S$ in the case where the Li content is high, or have an ion conductivity decreased in the case where the Li content is low. Further, the sulfide solid electrolyte may possibly have atmospheric stability decreased because of the precipitation of $Li_2S$ in the case where the content of N is high, or fail to sufficiently produce the effects of containing N such as improved atmospheric stability in the case where the content of N is low.

From these viewpoints, the element ratios of the above-mentioned composition in a mixture preferably satisfy the following formulas respectively in terms of mole ratio at the same time.

$2.30 \leq Li/P \leq 4.20$ $0.0100 \leq N/P \leq 1.20$

The above-mentioned Li/P and N/P more preferably satisfy the following formulas at the same time.

$2.36 \leq Li/P \leq 4.12$ $0.0200 \leq N/P \leq 1.11$

The above-mentioned Li/P and N/P further preferably satisfy the following formulas at the same time.

$2.36 \leq Li/P \leq 4.00$ $0.0600 \leq N/P \leq 0.900$

The above-mentioned Li/P and N/P even more preferably satisfy the following formulas at the same time.

$2.60 \leq Li/P \leq 3.40$ $0.190 \leq N/P \leq 0.710$

It is particularly preferable that the above Li/P and the above N/P satisfy the following equations at the same time.

$2.77 \leq Li/P \leq 3.38$ $0.280 \leq N/P \leq 0.650$

Furthermore, the respective elemental mole ratios of Li, P, S, N, and the element M in the composition mentioned above preferably satisfy the general formula $(100-z)(yLi_2S \cdot (1-y)P_2S_5) \cdot zLi_\alpha M_\beta N$ (where $0<z \leq 40$, $0.50 \leq y \leq 0.75$, $\alpha$ and $\beta$ represent numerical values that provide stoichiometric ratios depending on the type of the element M). This makes it possible to produce a sulfide solid electrolyte that is excellent in atmospheric stability and ionic conductivity at 25° C.

It is to be noted that the general formula mentioned above is intended to show the content ratios of Li, S, P, N, and the element M, and not intended to specify that the composition is composed of $Li_2S$, $P_2S_5$, and $Li_\alpha M_\beta N$.

z in the general formula mentioned above is preferably more than 0 and 40 or less, more preferably 1 or more and 30 or less. z in the general formula falls within the range mentioned above, thereby making it possible to a sulfide solid electrolyte that is excellent in atmospheric stability and ion conductivity. Further, with $1 \leq z \leq 30$, it is possible to produce a sulfide solid electrolyte that has an increased ion conductivity at 25° C. With $10 \leq z \leq 40$, so-called cross-linked sulfur $P_2S_7^{4-}$ ($S_3P$—S—$PS_3$), which is unstable in the atmosphere, is reduced, thereby making it possible to a sulfide solid electrolyte that is excellent in atmospheric stability substantially without containing $Li_2S$, which is likely to react with water.

y in the general formula mentioned above is preferably 0.50 or more and 0.75 or less, more preferably 0.67 or more and 0.70 or less. The content ratios of $Li_2S$ and $P_2S_5$ in the composition mentioned above falls within the ranges mentioned above, thereby making it possible to produce a sulfide solid electrolyte that has an increased ion conductivity at 25° C.

$\alpha$ and $\beta$ in the general formula mentioned above represent numerical values that provide stoichiometric ratios depending on the type of the element M. The values of $\alpha$ and $\beta$ are not particularly limited, but may be, for example, $0.80 \leq \alpha \leq 3.0$ and $0.10 \leq \beta \leq 1.2$.

(Reaction Step)

In this step, the composition containing Li, P, S, N, and the element M is subjected to mechanical milling to react the above-mentioned composition, thereby providing an intermediate.

It is to be noted that the means for obtaining the intermediate is not limited thereto, and the intermediate may be obtained by other methods. For example, in FIG. 1, instead of mechanical milling, a melt quenching method or the like may be employed.

The mechanical milling may be either dry or wet, but is preferably wet because the raw material compounds can be mixed more homogeneously. Examples of the mechanical milling include case-driven mills, medium stirring mills, milling with a high-speed rotary crusher, roller mills, and jet mills. Examples of the case-driven mill include rotary mills, vibration mills, and planetary mills. Examples of the medium stirring mill include attritors and bead mills. Examples of the milling with a high-speed rotary crusher include hammer mills and pin mills Among these examples, the case-driven mills are preferable, and the planetary mills are particularly preferable.

The intermediate obtained in the reaction step may have a crystalline structure, but is preferably so-called sulfide glass. The "sulfide glass" means a sulfide solid electrolyte including an amorphous structure. When the intermediate is sulfide glass, there are few crystal phases with low atmospheric stability such as $Li_2S$, and a sulfide solid electrolyte can be obtained in which N, the element M, and the like are highly dispersed.

(Heat Treatment Step)

In this step, the intermediate is subjected to a heat treatment at a temperature that is equal to or higher than the crystallization temperature, thereby producing a sulfide solid electrolyte. The heat treatment may be performed under a reduced-pressure atmosphere or under an inert gas atmosphere. The crystallization temperature can be determined by measurement with a differential scanning calorimeter (DSC). For example, in order to obtain a $Li_7P_3S_{11}$ crystalline structure, the heat treatment temperature is preferably 250° C. or higher and 400° C. or lower, and in order to obtain a β-$Li_3PS_4$ crystalline structure, the heat treatment temperature is preferably 200° C. or higher and 400° C. or lower, in addition, in order to obtain the first crystalline structure that has diffraction peaks at 2θ=17.9°±0.5°, 19.1°±0.5°, 29.1°±0.5°, and 29.8°±0.5° in X-ray diffraction measurement with a CuKα line, the heat treatment temperature is preferably 250° C. or higher and 400° C. or lower. This is because a phase transition to $Li_4P_2S_6$, which is a stable phase, may be caused in the case of a heat treatment at a high temperature such as 500° C.

MODIFICATION EXAMPLES

The method for producing a sulfide solid electrolyte according to the present invention is not to be considered limited to the embodiment mentioned above, and can be put into practice in various modified and improved aspects, besides the aspects mentioned above.

Although the $Li_2S$—$P_2S_5$-based sulfide solid electrolyte has been described as an example in the embodiment mentioned above, an LGPS-type sulfide solid electrolyte or an argyrodite-type sulfide solid electrolyte may be produced by the production method.

Examples of the LGPS-type sulfide solid electrolyte include $Li_{10}GeP_2S_{12}$. The crystalline structure with the crystal phase of $Li_{10}GeP_2S_{12}$ has diffraction peaks at the positions of 2θ=14.4°±0.5°, 20.1°±0.5°, 20.4°±0.5°, 26.9°±0.5°, 29.5°±0.5°, and 47.3°±0.5° in the X-ray diffraction measurement with the CuKα line used.

Examples of the argyrodite-type sulfide solid electrolyte include $Li_6PS_5Cl$. The crystalline structure with the crystal phase of $Li_6PS_5Cl$ has diffraction peaks at the positions of 2θ=15.6°±0.5°, 25.5°±0.5°, 30.0°±0.5°, 31.4°±0.5°, 45.0°±0.5°, and 52.5°±0.5° in the X-ray diffraction measurement with the CuKα line used.

Modification Example 1

As Modification Example 1, an aspect of producing an LGPS-type sulfide solid electrolyte will be described.

The LGPS-type sulfide solid electrolyte can be produced by adding a raw material compound containing Ge to the above-mentioned composition in the preparation step mentioned above. Examples of the raw material compound containing Ge include $GeS_2$. In the case of producing an LGPS-type sulfide solid electrolyte, the element ratios of the above-mentioned composition preferably satisfy the following formulas in terms of mole ratio at the same time.

$5.01 \leq Li/P \leq 5.61$ $0.0051 \leq N/P \leq 0.41$

The content ratios of the elements in the composition fall within the ranges mentioned above, thereby making it possible to produce a sulfide solid electrolyte that has a crystal phase of $Li_{10}GeP_2S_{12}$ and has a high ion conductivity at 25° C.

Modification Example 2

As Modification Example 2, an aspect of producing a sulfide solid electrolyte that contains Li, P, S, N, the element X, and the element M as constituent elements and has a crystalline structure will be described. X is at least one element selected from the group consisting of Cl, Br, and I.

According to Modification Example 2, a sulfide solid electrolyte that contains Li, P, S, N, the element X, and the element M and has crystallinity is produced by adding a raw material compound containing the element X to the above-mentioned composition. This makes it possible to produce a sulfide solid electrolyte that has an HICP and improved thermal stability of HICP.

Examples of the raw material compound containing the element X include lithium halides, sulfur halides, phosphorus halides, and halides of the element M represented by $M_\eta X_\sigma$ (where η=1 or 2 and σ=an integer of 1 to 10).

Examples of the lithium halides include LiCl, LiBr, and LiI.

Examples of the sulfur halides include $SCl_2$, $S_2Cl_2$, $SBr_2$, $S_2Br_2$, $SI_2$, and $S_2I_2$.

Examples of the phosphorus halides include $PCl_3$, $PCl_5$, $POCl_3$, $PBr_3$, $PBr_5$, $POBr_3$, $PCl_4$, and $P_2I_4$.

Examples of the halides of the element M include $AlBr_3$, $BBr_3$, $AlCl_3$, $AlBr_3$, $AlI_3$, $SiCl_3$, $SiCl_4$, $SiBr_4$, $SiI_4$, $SiBrI_3$, $SiBr_2I_2$, $SiBr_3I$, $BCl_3$, $BBr_3$ and $BI_3$.

Among these halides, the lithium halides and the phosphorus halides are preferable, and the lithium halides are more preferable. LiBr and LiI are preferable as the lithium halides.

For the raw material compound containing the element X, one compound may be used alone, or two or more compounds may be used in mixture. In addition, the above-mentioned composition may, as the element X, contain one element alone, or two or more elements. In particular, from the viewpoint of increasing the ion conductivity at 25° C., Br or I is preferably contained alone as the element X, and more preferably, Br is contained alone. In addition, it is also preferable to contain Br and I at the same time.

In Modification. Example 2, in the case where the composition mentioned above contains Br and I at the same time, the content of Br with respect to the total amount of Br and I in the composition is preferably 1 mol % or more and 99 mol % or less, more preferably 5 mol % or more and 80 mol % or less.

The sulfide solid electrolyte may possibly have atmospheric stability decreased because of the precipitation of $Li_2S$ in the case where the Li content is high, or fail to have any HICP deposited in the case where the Li content is low. Further, the sulfide solid electrolyte may possibly have atmospheric stability decreased because of the precipitation of $Li_2S$ in the case where the content of N is high, or fail to sufficiently produce the effects of containing N in the case where the content of N is low. Further, in the case where the content of the element X is high, a crystal phase of lithium halide may remain in the sulfide solid electrolyte, thereby decreasing the ion conductivity, or the effect of containing the element X may possibly fail to be sufficiently produced in the case where content is low.

From these viewpoints, the element ratios of the above-mentioned composition in the preparation step of Modification. Example 2 in a mixture preferably satisfy the following formulas respectively in terms of mole ratio at the same time.

$3.10 \leq Li/P \leq 4.20$ $0.0600 \leq N/P \leq 0.750$ $0.180 \leq X/P \leq 1.30$ Further, the above-mentioned Li/P, N/P, and X/P more preferably satisfy the following formulas at the same time.

$$3.10 \leq Li/P \leq 3.90$$

$$0.0900 \leq N/P \leq 0.750$$

$$0.180 \leq X/P \leq 1.00$$

The respective elemental mole ratios of Li, P, S, N, the element X, and the element M in the composition mentioned above preferably satisfy the general formula $(100-z)\{(1-y)[xLi_2S\cdot(1-x)P_2S_5]\cdot yLi_\alpha M_\beta N\}\cdot zLiX$ (where $0.50 \leq x \leq 0.80$, $0 < y \leq 0.50$, $5 \leq z \leq 40$, $\alpha$ and $\beta$ represent numerical values that provide stoichiometric ratios depending on the type of element M), and more preferably, x, y, and z respectively meet $0.67 \leq x \leq 0.73$, $0.10 \leq y \leq 0.30$ and $10 \leq z \leq 30$. This makes it possible improve the thermal stability of the HICP.

In the case where the composition contains two types of elements $X_1$ and $X_2$ as the element X, the general formula mentioned above can be also expressed by $(100-z_1-z_2)\{(1-y)[xLi_2S\cdot(1-x)P_2S_5]\cdot yLi_\alpha M_\beta N\}\cdot z_1LiX_1\cdot z_2LiX_2$ (where $0.50 \leq x \leq 0.800 < y \leq 0.50$, $5 \leq (z_1+z_2) 40$, $\alpha$ and $\beta$ represent numerical values that provide stoichiometric ratios depending on the type of element M), and in this case, x, y, $z_1$, and $z_2$ preferably respectively meet $0.67 \leq x \leq 0.73$, $0.10 \leq y \leq 0.30$, and $10 \leq (z_1+z_2) \leq 30$.

It is to be noted that the general formula mentioned above is intended to show the content ratios of Li, S, P, N, the element M, and the element X, and not intended to specify that the composition is composed of $Li_2S$, $P_2S_5$, $Li_\alpha M_\beta N$, and LiX.

The general formula may have $\alpha=2/3$ and $\beta=1/2$ in the case where the element M is either Al or B. In this case, x, y, and z preferably respectively meet $0.50 \leq x \leq 0.80$, $0 < y \leq 0.50$, and $5 \leq z \leq 40$, more preferably $0.60 \leq x \leq 0.75$, $0.050 \leq y \leq 0.40$, and $10 \leq z \leq 30$, further preferably $0.67 \leq x \leq 0.73$, $0.10 \leq y \leq 0.30$, and $15 \leq z \leq 25$.

The raw material for use in the reaction step of Modification Example 2 preferably includes a Li compound, a P compound, a halogen compound, and a Li-M-N-containing compound, and more preferably, at least one of the above-mentioned Li compound and P compound contains an S element. Furthermore, a lithium sulfide, a phosphorus sulfide, a lithium halide, and a compound represented by the general formula $Li_\alpha M_\beta N$ ($\alpha$ and $\beta$ represent numerical values that provide stoichiometric ratios depending on the type of the element M) are further preferably contained as the Li compound, the P compound, the halogenated compound, and the Li-M-N containing compound.

In the heat treatment step of Modification Example 2, an intermediate is subjected to a heat treatment at a temperature that is equal to or higher than the crystallization temperature, thereby producing a sulfide solid electrolyte. The heat treatment may be performed under a reduced-pressure atmosphere or under an inert gas atmosphere. The crystallization temperature can be determined by measurement with a differential scanning calorimeter (DSC).

According to Modification Example 2, a sulfide solid electrolyte that has an HICP is produced. The HICP is presumed to undergo a phase transition to any of an LICP or a specific crystalline structure C, and then further undergo a phase transition to $\beta$-$Li_3PS_4$. Among these crystal phases, the HICP has the highest ion conductivity.

Accordingly, in the heat treatment step in Modification Example 2, the lower limit of the heat treatment temperature is preferably equal to or higher than the formation temperature $T_H$ of the HICP. In addition, the upper limit of the heat treatment temperature is preferably equal to or lower than the formation temperature $T_\beta$ of $\beta$-$Li_3PS_4$, more preferably equal to or lower than the formation temperature $T_L$ of the LICP or the formation temperature $T_C$ of the specific crystalline structure C. $T_H$, $T_L$, $T_C$, and $T_\beta$ can be determined by XRD measurement.

For the sulfide solid electrolyte produced according to Modification Example 2, $T_\beta$-$T_H$ preferably meets $T_\beta$-$T_H \geq 40°$ C., more preferably $T_\beta$-$T_H \geq 50°$ C., further preferably $T_\beta$-$T_H \geq 60°$ C., particularly preferably $T_\beta$-$T_H \geq 70°$ C.

The sulfide solid electrolyte produced according to Modification Example 2 has a wide range of heat treatment temperature in which the ion conductivity is not decreased. More specifically, even if the heat treatment temperature deviates from the intended temperature in the heat treatment step, the ion conductivity of the produced sulfide solid electrolyte may be less likely to be decreased. Accordingly the aspect of Modification Example 2 has the advantage of being capable of producing a sulfide solid electrolyte with a high ion conductivity without the need for strict temperature control in the heat treatment step.

It is to be noted that the "HICP" represents a crystal phase that has diffraction peaks at $2\theta=20.2°\pm0.5°$ and $23.6°\pm0.5°$ in X-ray diffraction measurement with a CuK$\alpha$ line. This crystalline structure refers to the crystal phase described in Patent Document 2 and the like, and a crystal phase with a high Li ion conductivity. The "LICP" refers to a crystal phase that has diffraction peaks at $2\theta=21.0°\pm0.5°$ and $28.0°\pm0.5°$ in X-ray diffraction measurement with a CuK$\alpha$ line. This crystalline structure refers to the crystal phase described in Patent Document 2 and the like, and a crystal phase with a low Li ion conductivity. The "specific crystalline structure C" represents a crystal phase that has diffraction peaks at $2\theta=17.5°\pm0.5°$ and $24.9°\pm0.5°$ in X-ray diffraction measurement with a CuK$\alpha$ line. The "$\beta$-$Li_3PS_4$" represents a crystal phase that has diffraction peaks at $2\theta=17.5°\pm0.5°$, $18.1°\pm0.5°$, $29.1°\pm0.5°$, $29.9°\pm0.5°$, and $31.2°\pm0.5°$ in X-ray diffraction measurement with a CuK$\alpha$ line.

The X-ray diffraction measurement with the CuK$\alpha$ line used in this specification is made in accordance with the following procedure. The airtight sample holder for X-ray diffraction measurement is filled with the solid electrolyte powder to be subjected to the measurement under an argon atmosphere with a dew point of $-50°$ C. or lower. Powder X-ray diffraction measurement is made with the use of an X-ray diffractometer ("MiniFlex II" from Rigaku Corporation). With a radiation source of a CuK$\alpha$ line, a tube voltage of 30 kV, a tube current of 15 mA, the diffracted X-ray is detected by a high-speed one-dimensional detector (model number: D/teX Ultra 2) through a K$\beta$ filter with a thickness of 30 μm. The sampling width is 0.01°, the scan speed is 5°/min, the divergent slit width is 0.625°, the light-receiving slit width is 13 ram (OPEN), and the scattering slit width is 8 mm.

<Method for Selecting Raw Material Compound>

The method for producing a sulfide solid electrolyte according to the present invention is capable of suppressing, through the use of the raw material compound containing N, the element A, and the element M, the discharge of N to the outside of the system in the process of producing a sulfide solid electrolyte.

In selecting the element A and the element M for achieving such an effect, the present inventors use the first principle calculation.

Hereinafter, a method for selecting a raw material compound for use in producing a sulfide solid electrolyte according to an embodiment of the present invention will be described.

According to the present embodiment, the raw material compound is selected in accordance with the procedure described in (1) to (3).

(1) Selecting a candidate material containing N, an element A', and an element M', where the first neighbor atom of the element A' and element M' is N.

(2) Using the first principle calculation to calculate the defect generation energy $E_{Ndefect}$ of N inside the candidate material.

(3) Selecting, as the raw material compound, the candidate material in the case where the $E_{Ndefect}$ is 4.00 eV or more.

The first principle calculation is a calculation method of predicting properties in a non-empirical manner, which is an approach that is capable of calculating the total energy of a model including atoms with known atomic numbers and spatial coordinates, and the energy band structure of electrons. The calculation of the force acting on the atoms allows structural optimization, and allows the lattice constant, the stable structure at 0 K, the band gap, etc. to be calculated. The calculation method includes two roughly classified types of "wave function theory" system and "density functional theory" system. The calculation method used in the specification of the present application is based on the density functional theory.

The defect generation energy $E_{Ndefect}$ of N refers to an energy value required for desorbing N from the crystalline structure to generate defects.

The defect generation energy of N refers to a value calculated with the use of the total energy $E_{perfect}$ of a crystalline structure including no defects, the total energy $E_{Nvacancy}$ of a crystalline structure including N defects, and the chemical potential of an N atom, which is defined by the following formula (1).

$$E_{Ndefect} = (E_{Nvacancy} + \mu_N) - E_{perfect} \quad \text{formula (1)}$$

More specifically, the procedure for calculating the defect generation energy $E_{Ndefect}$ of N is as follows:

(a) Obtaining the composition and crystalline structure of candidate material.

(b) Calculating the chemical potential $\mu_N$ of the N atom desorbed as a defect.

(c) Calculating the total energy $E_{perfect}$ of the crystalline structure including no defects by structural optimization calculation.

(d) Calculating the total energy $E_{Nvacancy}$ of the crystalline structure including N defects by structural optimization calculation.

(e) Calculating the defect generation energy $N_{defect}$ of N in accordance with the formula (1).

In the case where there are multiple N-occupied sites in the crystalline structure of the candidate material, the $E_{Ndefect}$ is calculated for each N-occupied site, and the $E_{Ndefect}$ that has the lowest value is used as the $E_{Ndefect}$ of the candidate material.

The composition and crystalline structure of the candidate material can be arbitrarily selected from those available from known publications, databases, and the like. The candidate material is not particularly limited as long as the material is a compound containing N, the element A', and the element M', but is preferably a compound that is stable under ordinary temperatures and pressures.

According to the present embodiment, the element A' is a metal element. The element M' is an element other than nitrogen belonging to any of Group 2 to Group 15 of the periodic table, and is an element that is different from the element A'. N is a nitrogen element.

The element A' is not particularly limited, but is preferably any of an alkali metal element, an alkaline earth metal element, and an aluminum element, more preferably at least one selected from Li, Na, K, Mg, Ca, and Al, further preferably, Li. This makes it easy to operate the sulfide solid electrolyte as a battery.

According to the present embodiment, the defect generation energy of N is calculated for the candidate material represented by $Li_\alpha M'_\beta N$ (α and β represent numerical values that provide stoichiometric ratios depending on the type of element M), and $Li_3N$. More specifically, Li is selected as the element A', B, Mg, Al, Si, P, Ca, Sr, Ti, V, Cr, Mn, Fe, Co, Ni, Zn, Ga, Ge, Sr, Y, Zr, Nb, In, Sn, Ce, Hf, Ta, and C are evaluated as the element M'.

The calculation software of Vienna Ab-initio Simulation Package (VASP) is used for the first principle calculation. The calculation conditions are as follows. The k point is set such that the k-resolution value is approximately 1000. The k-resolution is the product of the number of atoms in the model and the k points in the directions of a, b and c axes.

Cut-off energy of plane wave basis function: 520 eV
Approximation of exchange-correlation interaction: GGA+U
Pseudopotential: PAW(PBEsol)
k point: k-resolution≈1000
Convergent condition for SCF calculation: $10^{-4}$ eV
Occupancy of each atomic site (Occ.): 1

The Hubbard $U_{eff}$ values shown in Table 1 are used as the calculation conditions for the first principle calculation for materials containing transition metal elements V, Cr, Mn, Fe, Co, and Ni where the 3d orbitals are the outermost shell orbitals, and the 3d orbitals are not closed shells in the states of cations with valences considered stable, with electrons in the 3d orbitals. Thus, the effect of electron localization in the d-orbitals is reflected in the calculation. The Hubbard $U_{eff}$ values shown in Table 1 are cited from the calculation conditions for the first principle calculation performed in the crystalline structure database: Materials Project (https://materialsproject.orgt#search/materials) (as of Aug. 22, 2019). The $U_{eff}$ values are obtained by searching the database for materials containing V, Cr, Mn, Fe, Co, and Ni.

TABLE 1

| Element | Ueff/eV |
| --- | --- |
| V | 3.25 |
| Cr | 3.70 |
| Mn | 3.90 |
| Fe | 5.30 |
| Co | 3.32 |
| Ni | 6.20 |

In addition, in the procedure (d) mentioned above, the calculation model cell is designed such that the lattice constants a, b, and c are all approximately 10 Å to the extent that the total number of atoms is not more than 200, in order to reduce the interaction between N defects. Table 2 shows the lattice constants used in the calculation of some candidate materials.

TABLE 2

| Composition | Number of atom/— | a/Å | b/Å | c/Å | α/deg. | β/deg. | γ/deg. | Volume/Å³ |
|---|---|---|---|---|---|---|---|---|
| $Li_3N$ | 108 | 10.8 | 10.8 | 11.5 | 90.0 | 90.0 | 120.0 | 1168.6 |
| $Li_{3/2}Al_{1/2}N$ | 192 | 8.20 | 16.3 | 16.3 | 109.5 | 109.5 | 109.5 | 1680.7 |
| $Li_{3/2}B_{1/2}N$ | 96 | 10.2 | 7.00 | 13.4 | 90.0 | 112.9 | 90.0 | 885.1 |

Table 3 shows the element M', and the chemical composition and defect generation energy $E_{Ndefect}$ of N for each candidate material.

TABLE 3

| System | Composition | Defect element | $E_{Ndefect}$/eV |
|---|---|---|---|
| — | $Li_3N$ | N | 2.94 |
| B | $Li_{3/2}B_{1/2}N$ | N | 4.35 |
| C | $LiC_{1/2}N$ | N | 4.12 |
| Mg | $LiMgN$ | N | 4.38 |
| Al | $Li_{3/2}Al_{1/2}N$ | N | 5.36 |
| Si | $Li_{5/3}Si_{1/3}N$ | N | 4.48 |
| P | $Li_{7/4}P_{1/4}N$ | N | 4.11 |
| Ca | $LiCaN$ | N | 3.28 |
| Sc | $Li_{3/2}Sc_{1/2}N$ | N | 4.48 |
| Ti | $Li_{5/3}Ti_{1/3}N$ | N | 4.00 |
| V | $Li_{7/4}V_{1/4}N$ | N | 3.88 |
| Cr | $Li_{3/2}Cr_{1/4}N$ | N | 2.32 |
| Mn | $Li_{7/4}Mn_{1/4}N$ | N | 2.23 |
| Fe | $Li_{3/2}Fe_{1/2}N$ | N | −4.45 |
| Co | $Li_{3/2}Co_{1/2}N$ | N | 1.17 |
| Ni | $Li_{5/3}NiN$ | N | −4.05 |
| Zn | $LiZnN$ | N | 2.86 |
| Ga | $Li_{3/2}Ga_{1/2}N$ | N | 3.35 |
| Ge | $Li_{5/3}Ge_{1/3}N$ | N | 2.72 |
| Sr | $LiSrN$ | N | 2.16 |
| Y | $Li_{3/2}Y_{1/2}N$ | N | 3.75 |
| Zr | $LiZr_{1/2}N$ | N | 4.07 |
| Nb | $Li_{7/4}Nb_{1/4}N$ | N | 4.37 |
| In | $Li_{3/2}In_{1/2}N$ | N | 1.64 |
| Sn | $LiSn_{1/2}N$ | N | 3.00 |
| Ce | $LiCe_{1/2}N$ | N | 3.12 |
| Hf | $LiHf_{1/2}N$ | N | 4.33 |
| Ta | $Li_{7/4}Ta_{1/4}N$ | N | 4.69 |

From Table 3, it is determined that the defect generation energy $E_{Ndefect}$ of N in $Li_3N$, in which N defects are likely to be generated, is 2.94 eV.

In addition, it is determined that each element of V, Y, Ga, Ca, Ce, Sn, Zn, Ge, Cr, Mn, Sr, In, Co, Ni, and Fe has low N defect generation energy $E_{Ndefect}$zf_0nT of 3.88 eV or less in $Li_\alpha M'_\beta N$. Thus, the candidate materials containing any of V, Y, Ga, Ca, Ce, Sn, Zn, Ge, Cr, Mn, Sr, In, Co, Ni, and Fe as the element M' are predicted to be likely to generate N defects, and fail to achieve the effect of the present invention for suppressing the discharge of N to the outside of the system in the process of producing the sulfide solid electrolyte or achieve the reduced effect.

In contrast, it is determined that each element of Al, Ta, Si, Sc, Mg, Nb, B, Hf, C, P, Zr, and Ti has high N defect generation energy $E_{Ndefect}$ of 4.00 eV or more in $Li_\alpha M'_\beta N$. Thus, the candidate materials containing any of Al, Ta, Si, Sc, Mg, Nb, B, Hf, C, P, Zr, and Ti as the element M' are predicted to be unlikely to generate N defects, and extremely likely to achieve the effect of the present invention for suppressing the discharge of N to the outside of the system in the process of producing the sulfide solid electrolyte.

The candidate materials are, as the defect generation energy $E_{Ndefect}$ of N has a larger value, predicted to be less likely to generate N defects, and be capable of further suppressing the discharge of N to the outside of the system in the process of producing the sulfide solid electrolyte. For this reason, according to the present embodiment, the defect generation energy $E_{Ndefect}$ of N of the candidate material is 4.00 eV or more, preferably 4.10 eV or more, more preferably 4.20 eV or more, further preferably 4.30 eV or more, particularly preferably 4.35 eV or more.

In this embodiment, the calculation is performed for the case of containing Li as the element A'. More specifically, the first principle calculation is performed with $Li_\alpha M'_\beta N$ as a model. The present invention is, however, not limited thereto. The element A' has only to be a metal element, and for example, candidate materials containing any of Na, K, Mg, Ca, and Al as the element A' may be selected, and the raw material compound may be selected with the use of the first principle calculation.

<Sulfide Solid Electrolyte>

Embodiment 1

A sulfide solid electrolyte according to an embodiment of the present invention is a composition containing P, S, N, an element A, and an element M, which is produced by a production method including: preparing a raw material compound containing N, the element A, and the element M; reacting the composition to obtain an intermediate; and heating the intermediate to obtain a sulfide solid electrolyte. Hereinafter, the sulfide solid electrolyte will be described with reference to, as an example, a case of containing Li as the element A.

The sulfide solid electrolyte has a crystalline structure. The phrase "to have a crystalline structure" means that a peak derived from the crystalline structure of the sulfide solid electrolyte is observed in the X-ray diffraction pattern in the X-ray diffraction measurement. The sulfide solid electrolyte may contain an amorphous portion.

Examples of the crystalline structure of the sulfide solid electrolyte include an HICP a LGPS type, an argyrodite type, $Li_7P_3S_{11}$, and Thio-LISICON series. Among these structures, as the crystalline structure, the HICP, the LGPS type, the argyrodite type, and $Li_7P_3S_{11}$ are preferable from the viewpoint of lithium ion conductivity, and among these structures, $Li_7P_3S_{11}$ is more preferable because of the high stability to Li. From the viewpoint of stability to the atmosphere, it is preferable to include a crystalline structure that has a crystal phase of $Li_4P_2S_6$ or $β-Li_3PS_4$, or a first crystalline structure that has diffraction peaks at 2θ=17.9°±0.5°, 19.1°±0.5°, 29.1°±0.5°, and 29.8°±0.5° in X-ray diffraction measurement with a CuKα line, and among these structures, the first crystalline structure that has diffraction peaks at 2θ=17.9°±0.5°, 19.1°±0.5°, 29.1°±0.5°, and 29.8°±0.5° in X-ray diffraction measurement with a CuKα line is more preferable because of the high lithium ion conductivity.

The first crystalline structure may include a specific crystalline structure A that has diffraction peaks at 2θ=17.9°±0.5°, 19.1°±0.5°, 29.1°±0.5°, 29.8°±0.5°, and 30.9°±0.5° in the X-ray diffraction measurement, or a specific crystalline structure B that has diffraction peaks at 2θ=17.9°±0.5°, 19.1°±0.5°, 29.1°±0.5°, and 29.8°±0.5° and has no diffraction peak at 30.9°±0.5° in the X-ray diffraction measurement. The above-mentioned configuration provides a sulfide solid electrolyte capable of increasing the first coulombic efficiency of an all-solid-state battery including the solid electrolyte.

The diffraction peaks in the first crystalline structure may fall within the above-mentioned ranges of 2θ, within the ranges of ±0.3°, or within the ranges of ±0.1°.

The crystalline structure with the crystal phase of $Li_7P_3S_{11}$ has diffraction peaks at the positions of 2θ=17.8°±0.5°, 18.5°±0.5°, 23.7°±0.5°, 29.6°±0.5°, and 30.0°±0.5° in X-ray diffraction measurement with a CuKα line.

Examples of the LGPS-type sulfide solid electrolyte include $Li_{10}GeP_2S_{12}$. The crystalline structure with the crystal phase of $Li_{10}GeP_2S_{12}$ has diffraction peaks at the positions of 2θ=14.4°±0.5°, 20.1°±0.5°, 20.4°±0.5°, 26.9°±0.5°, 29.5°±0.5°, and 47.3°±0.5° in the X-ray diffraction measurement with the CuKα line used.

Examples of the argyrodite-type sulfide solid electrolyte include $Li_6PS_5Cl$. The crystalline structure with the crystal phase of $Li_6PS_5Cl$ has diffraction peaks at the positions of 2θ=15.6°±0.5°, 25.5°±0.5°, 30.0°±0.5°, 31.4°±0.5°, 45.0°±0.5°, and 52.5°±0.5° in the X-ray diffraction measurement with the CuKα line used.

The crystalline structure with the crystal phase of $Li_4P_2S_6$ has diffraction peaks at positions 2θ=16.9°±0.5°, 27.1°±0.5°, 32.1°±0.5°, and 32.5°±0.5° in X-ray diffraction measurement with a CuKα line.

The crystalline structure with the crystal phase of β-$Li_3PS_4$ has diffraction peaks at the positions of 2θ=17.5°±0.5°, 18.1°±0.5°, 29.1°±0.5°, 29.9°±0.5°, and 31.2°±0.5° in X-ray diffraction measurement with a CuKα line.

The sulfide solid electrolyte preferably contains, as a main component, an anion structure that has a so-called ortho composition. For example, in the case where the sulfide solid electrolyte is a $Li_2S$—$P_2S_5$-based solid electrolyte, the electrolyte preferably contains the $PS_4^{3-}$ structure as a main component. The "main component," herein means that the ratio of a specific component to all of the components is 50 mol % or more.

In the case where the sulfide solid electrolyte contains, as a main component, an anion structure that has an ortho composition, the content of the anion structure that has an ortho composition to the whole anion structure constituting the sulfide solid electrolyte is 50 mol % or more and less than 100 mol % preferably 60 mol % or more and less than 100 mol %, more preferably 70 mol % or more and less than 100 mol %, further preferably 80 mol % or more and less than 100 mol %, particularly preferably 90 mol % or more and less than 100 mol %.

The sulfide solid electrolyte preferably contains substantially no cross-linked sulfur. Since cross-linked sulfur reacts with water to produce hydrogen sulfide, atmospheric stability can be improved by containing substantially no cross-linked sulfur. For example, in the case where the sulfide solid electrolyte is a $Li_2S$—$P_2S_5$-based solid electrolyte, the electrolyte preferably contains substantially no $S_3P$—S—$PS_3$ structure.

Containing substantially no cross-linked sulfur can be confirmed by the fact that the peak corresponding to the cross-linked sulfur structure is not detected in measuring the Raman spectroscopy spectrum with a laser of 532 nm in excitation wavelength. For example, containing substantially no $S_3P$—S—$PS_3$ structure can be confirmed by the fact that no peak is detected at 402 $cm^{-1}$ in measuring the Raman spectroscopy spectrum with a laser of 532 nm in excitation wavelength.

It is to be noted that the sulfide solid electrolyte is allowed to contain a small amount of crosslinked sulfur. In this case, the ratio $I_P/I_O$ of the intensity $I_P$ of the peak belonging to cross-linked sulfur to the intensity $I_O$ of the peak belonging to the anion structure of the ortho composition in Raman spectroscopy spectrum measurement is preferably 0.7 or less, more preferably 0.5 or less, further preferably 0.35 or less. For example, in the case where the sulfide solid electrolyte is a $Li_2S$—$P_2S_5$-based solid electrolyte, the peak intensity at 417 $cm^{-1}$ derived from the $PS_4^{3-}$ structure corresponds to the $I_O$ mentioned above, and the peak intensity at 402 $cm^{-1}$ derived from the $S_3P$—S—$PS_3$ structure corresponds to the $I_P$ mentioned above.

The sulfide solid electrolyte preferably contains substantially no $Li_2S$. Since $Li_2S$ reacts with water to produce hydrogen sulfide, atmospheric stability can be improved by containing substantially no $Li_2S$. In this regard, "containing substantially no $Li_2S$" means including no crystalline structure that has diffraction peaks at 2θ=27.0°±0.5°, 31.2°±0.5°, 44.8°±0.5° and 53.1°±0.5° in X-ray diffraction measurement with a CuKα line.

The sulfide solid electrolyte may possibly have atmospheric stability decreased because of the precipitation of $Li_2S$ in the case where the Li content is high, or have an ion conductivity decreased in the case where the Li content is low. Further, the sulfide solid electrolyte may possibly have atmospheric stability decreased because of the precipitation of $Li_2S$ in the case where the content of N is high, or fail to sufficiently produce the effects of containing N such as improved atmospheric stability in the case where the content of N is low.

From these viewpoints, the element ratios of the sulfide solid electrolyte preferably satisfy the following formulas respectively in terms of mole ratio at the same time.

$$2.30 \leq Li/P \leq 4.20$$

$$0.01\,00 \leq N/P \leq 1.20$$

The above-mentioned Li/P and N/P more preferably satisfy the following formulas at the same time.

$$2.36 \leq Li/P \leq 4.12$$

$$0.02\,00 \leq N/P \leq 1.11$$

The above-mentioned Li/P and N/P further preferably satisfy the following formulas at the same time.

$$2.36 \leq Li/P \leq 4.00$$

$$0.06\,00 \leq N/P \leq 0.900$$

The above-mentioned Li/P and N/P even more preferably satisfy the following formulas at the same time.

$$2.60 \leq Li/P \leq 3.40$$

$$0.190 \leq N/P \leq 0.710$$

It is particularly preferable that the above Li/P and the above N/P satisfy the following equations at the same time.

$$2.77 \leq Li/P \leq 3.38$$

$$0.280 \leq N/P \leq 0.650$$

The sulfide solid electrolyte preferably has a composition represented by the general formula $(100-z)(yLi_2S \cdot (1-y)P_2S_5) \cdot zLi_\alpha M_\beta N$ (where $0 < z \leq 40$, $0.50 \leq y \leq 0.75$, α and β represent numerical values that provide stoichiometric ratios depending on the type of the element M). The sulfide solid electrolyte has a composition represented by the general formula mentioned above, the atmospheric stability and the ion conductivity at 25° C. can be further improved. It is to be noted that the general formula mentioned above is intended to show the content ratios of Li, S, P, N, and the element M, and not intended to specify that the composition is composed of $Li_2S$, $P_2S_5$, and $Li_\alpha M_\beta N$.

The lower limit of the ion conductivity of the sulfide solid electrolyte at 25° C. is preferably $0.4 \times 10^{-3}$ S/cm, more preferably $1.0 \times 10^{-3}$ S/cm, further preferably $1.5 \times 10^{-3}$ S/cm. The ion conductivity of the sulfide solid electrolyte at 25° C. falls within the range mentioned above, thereby allowing the rate characteristics of an all-solid-state battery to be improved.

It is to be noted that the ion conductivity of the sulfide solid electrolyte at 25° C. is determined from measurement of the alternating-current impedance by the following method. Under an argon atmosphere with a dew point of −50° C. or lower, 120 mg of the sample powder is put into a powder molder of 10 mm in inner diameter, and then subjected to uniaxial pressing at a pressure of 50 MPa or less per sample area with the use of a hydraulic press. After pressure release, a SUS316L powder is put as a current collector onto the upper and lower surfaces of the sample, and then subjected to uniaxial pressing at a pressure of 360 MPa per pellet area for 5 minutes, thereby providing a pellet for ion conductivity measurement. This pellet for ion conductivity measurement is inserted into an HS cell from Hohsen Corp. to measure the alternating-current impedance. The measurement conditions are an applied voltage amplitude of 20 mV, a frequency range of 1 MHz to 100 mHz, and a measurement temperature of 25° C.

As described above, the sulfide solid electrolyte can be suitably used as a solid electrolyte for an all-solid-state battery.

Embodiment 2

A sulfide solid electrolyte according to another embodiment of the present invention contains Li, P, S, N, an element X, and an element M, The element X represents at least one element selected from the group consisting of Cl, Br, and I.

The sulfide solid electrolyte may contain one selected from the group consisting of Al, B, and Si as the element M, and may contain Al as the element M.

The sulfide solid electrolyte may possibly have no HICP deposited because of the precipitation of $Li_2S$ in the case where the Li content is high, or have an ion conductivity decreased in the case where the Li content is low. Further, the sulfide solid electrolyte may possibly have atmospheric stability decreased because of the precipitation of $Li_2S$ in the case where the content of N is high, or fail to sufficiently produce the effects of containing N in the case where the content of N is low. Further, in the case where the content of the element X is high, a crystal phase of lithium halide may remain in the sulfide solid electrolyte, thereby decreasing the ion conductivity; or the effect of containing the element X may possibly fail to be sufficiently produced in the case where content is low.

For these reasons, in the sulfide solid electrolyte, the content ratio Li/P of the Li to the P, the content ratio N/P of the N to the P, and the content ratio X/P of the X to the P preferably satisfy the following formulas respectively in terms of mole ratio at the same time.

$$3.10 < Li/P < 4.20$$

$$0.0600 < N/P < 0.750$$

$$0.180 < X/P < 1.30$$

Further, the above-mentioned Li/P, N/P, and X/P more preferably; satisfy the following formulas at the same time.

$$3.10 < Li/P < 3.90$$

$$0.0900 < N/P < 0.750$$

$$0.180 < X/P < 1.00$$

The sulfide solid electrolyte has a composition represented by the general formula $(100-z)\{(1-y)[xLi_2S \cdot (1-x)P_2S_5] \cdot yLi_\alpha M_\beta N\} \cdot zLiX$ (where $0.50 \leq x \leq 0.80$, $0 < y \leq 0.50$, $5 \leq z \leq 40$, $\alpha$ and $\beta$ represent numerical values that provide stoichiometric ratios depending on the type of element M), and more preferably, x, y, and z respectively meet $0.67 \leq x \leq 0.73$, $0.10 \leq y \leq 0.30$ and $10 \leq z \leq 30$. The sulfide solid electrolyte has a composition represented by the general formula mentioned above, the thermal stability of the HICP can be further improved.

In the case where the sulfide solid electrolyte contains two types of elements $X_1$ and $X_2$ as the element X, the general formula mentioned above can be also expressed by $(100-z_1-z_2)\{(1-y)[xLi_2S \cdot (1-x)P_2S_5] \cdot yLi_\alpha M_\beta N\} \cdot z_1 LiX_1 \cdot z_2 LiX_2$ (where $0.50 \leq x \leq 0.80$, $0 < y \leq 0.50$, $5 \leq (z_1+z_2) \leq 40$, $\alpha$ and $\beta$ represent numerical values that provide stoichiometric ratios depending on the type of element M), and x, y, $z_1$, and $z_2$ in this case preferably respectively meet $0.67 \leq x \leq 0.73$, $0.10 \leq y \leq 0.30$, and $10 \leq (z_1+z_2) \leq 30$.

It is to be noted that the general formula mentioned above is intended to show the content ratios of Li, S, P, N, the element M, and the element X, and not intended to specify that the composition is composed of $Li_2S$, $P_2S_5$, $Li_\alpha M_\beta N$, and LiX.

The general formula may have $\alpha=2/3$ and $\beta=1/2$ in the case where the element M is any of Al, B, and Sc. In this case, x, y, and, z preferably respectively meet $0.50 \leq x \leq 0.80$, $0 < y \leq 0.50$, and $5 \leq z \leq 40$, more preferably $0.60 \leq x \leq 0.75$, $0.050 \leq y \leq 0.40$, and $10 \leq z \leq 30$, further preferably $0.67 \leq x \leq 0.73$, $0.10 \leq y \leq 0.30$, and $15 \leq z \leq 25$.

The sulfide solid electrolyte preferably contains, as the element X, Br or I alone, more preferably Br alone. In addition, it is also preferable to contain Br and I at the same time.

In the case where the sulfide solid electrolyte contains Br and I at the same time, the content of Br with respect to the total amount of Br and I contained in the sulfide solid electrolyte is preferably 1 mol % or more and 99 mol % or less, more preferably 5 mol % or more and 80 mol % or less.

The sulfide solid electrolyte preferably contains an HICP. More specifically; the sulfide solid electrolyte preferably includes a crystalline structure that has diffraction peaks at $2\theta=20.2°\pm0.5°$ and $23.6°\pm0.5°$ in X-ray diffraction measurement with a CuKα line.

The sulfide solid electrolyte preferably contains no LICP. More specifically, the sulfide solid electrolyte preferably includes no crystalline structure that has diffraction peaks at $2\theta=21.0°\pm0.5°$ and $28.0°\pm0.5°$ in X-ray diffraction measurement with a CuKα line.

The sulfide solid electrolyte is allowed to contain a small amount of LICP. In this case, the diffraction peak intensity ratio $I_L/I_H$ of the diffraction peak intensity $I_L$ at $2\theta=21.0°\pm0.5°$ to the diffraction peak intensity $I_H$ at $2\theta=20.2°\pm0.5°$ in X-ray diffraction measurement with a CuKα line is preferably $0<I_L/I_H<3.2$, more preferably $0<I_L/I_H<2.5$, further preferably $0<I_L/T_H<2.0$, even more preferably $0<I_L/I_H<1.0$. The diffraction peak intensity ratio $I_L/I_H$ indicates the abundance ratio between the HICP and LICP included in the sulfide solid electrolyte. More specifically, the fact that the diffraction peak intensity ratio $I_L/T_H$ is low indicates that the amount of the LICP is relatively small with respect to the HICP.

The ion conductivity of the sulfide solid electrolyte according to Embodiment 2 at 25° C. is preferably $2.0\times10^{-3}$ S/cm or more, more preferably $2.5\times10^{-3}$ S/cm or more, further preferably $3.0\times10^{-3}$ Stem or more, particularly preferably $4.0\times10^{-3}$ S/cm or more. The configuration mentioned above allows the high rate discharge performance of the all-solid-state battery including the sulfide solid electrolyte to be improved.

<All-Solid-State Battery>

Figure 2:
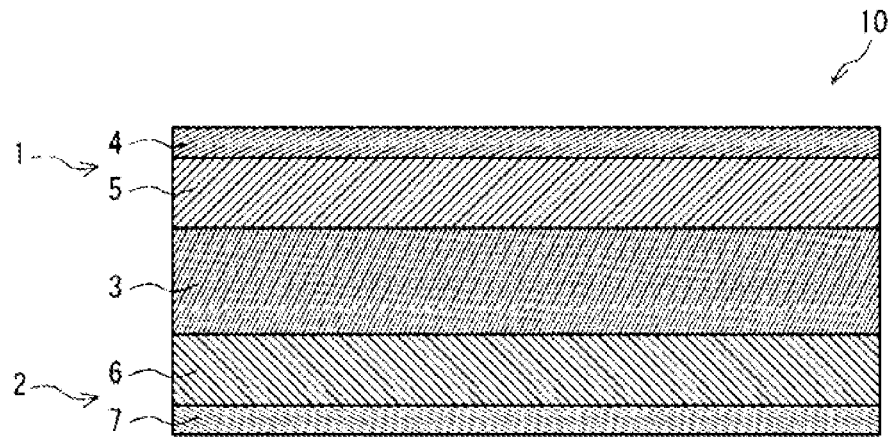
FIG. 2 is a schematic cross-sectional view illustrating an all-solid-state battery according to an embodiment of the present invention.

The all-solid-state battery includes a negative electrode layer, a solid electrolyte layer, and a positive electrode layer. FIG. 2 is a schematic cross-sectional view illustrating an all-solid-state battery according to an embodiment of the present invention. The all-solid-state battery 10, which serves as a secondary battery; has a negative electrode layer 1, and, a positive electrode layer 2 disposed with a solid electrolyte layer 3 interposed therebetween. The negative electrode layer 1 has a negative electrode substrate layer 4 and a negative composite layer 5, and the negative electrode substrate layer 4 serves as the outermost layer of the negative electrode layer 1. The positive electrode layer 2 has a positive electrode substrate layer 7 and a positive composite layer 6, and the positive electrode substrate layer 7 serves as the outermost; layer of the positive electrode layer 2. For the all-solid-state battery 10 shown in FIG. 2, the positive composite layer 6, the solid electrolyte layer 3, the negative composite layer 5, and the negative electrode substrate layer 4 are stacked in this order on the positive electrode substrate layer 7.

In the all-solid-state battery, the negative electrode layer 1, the solid electrolyte layer 3, the positive electrode layer 2, or a combination thereof contains the sulfide solid electrolyte. In the all-solid-state battery, the negative electrode layer 1, the solid electrolyte layer 3, the positive electrode layer 2, or a combination thereof contains the sulfide solid electrolyte, and the first coulombic efficiency is thus excellent. Because the sulfide solid electrolyte has excellent reduction resistance, the negative electrode layer 1 and/or the solid electrolyte layer 3 preferably contain the sulfide solid electrolyte. The configuration mentioned above makes the effect of the present invention much greater.

The all-solid-state battery may be used in combination with other solid electrolytes besides the sulfide solid electrolyte. The other solid electrolytes may be sulfide solid electrolytes other than the sulfide solid electrolyte described above, or may be oxide-based solid electrolytes, dry polymer electrolytes, gel polymer electrolytes, or pseudo solid electrolytes.

The sulfide solid electrolytes other than the sulfide solid electrolyte described above preferably has high Li ion conductivity, and examples thereof can include $Li_2S-P_2S_5$, $Li_2S-P_2S_5-LiCl$, $Li_2S-P_2S_5-LiBr$, $Li_2SP_2S_5-Li_2O$, $Li_2S-P_2S_5-Li_2O-LiI$, $Li_2S-P_2S_5-Li_3N$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-SiS_2-P_2S_5-LiI$, $Li_2S-B_2S_3$, $Li_2SP_2S_5-Z_mS_{2n}$ (where in and n represent positive numbers, Z represents any of Ge, Zn, and Ga), $Li_2S-GeS_2$, $Li_2S-SiS_2-Li_3PO_4$, $Li_2S-SiS_2-Li_\delta XO_\epsilon$ (where δ and ε represent positive numbers, X represents any of P, Si, Ge, B, Al, Ga, and In), and $Li_{10}GeP_2S_{12}$. Among these electrolytes, $Li_2S-P_2S_5$, $Li_{10}GeP_2S_{12}$, and the like are preferable from the viewpoint of favorable lithium ion conductivity. As $Li_2S-P_2S_5$, $xLi_2S\cdot(100-x)P_2S_5$ ($70\leq x\leq 80$) is preferable.

[Negative Electrode Layer]

The negative electrode layer 1, includes the negative electrode substrate layer 4 and the negative composite layer 5 stacked on the surface of the negative electrode substrate layer 4. The negative electrode layer 1 may have an intermediate layer, not shown, between the negative electrode substrate layer 4 and the negative composite layer 5.

(Negative Electrode Substrate Layer)

The negative electrode substrate layer 4 is a layer with conductivity. The material of the negative electrode substrate layer 4 is not limited as long as the material is a conductor. Examples of the material can include one or more metals selected from the group consisting of copper, aluminum, titanium, nickel, tantalum, niobium, hafnium, zirconium, zinc, tungsten, bismuth, antimony, gold, silver, iron, platinum, chromium, tin, and indium, and alloys containing one or more of these metals, as well as stainless-steel alloys.

The lower limit of the average thickness of the negative electrode substrate layer 4 is preferably 3 μm, more preferably 5 μm, further preferably 8 μm. The upper limit of the average thickness of the negative electrode substrate layer 4 is preferably 200 μm, more preferably 100 μm, further preferably 50 μm. The average thickness of the negative electrode substrate layer 4 is adjusted to be equal to or more than the lower limit mentioned above, thereby allowing the strength of the negative electrode substrate layer 4 to be sufficiently increased, and thus allowing the negative electrode layer 1 to be favorably formed. The average thickness of the negative electrode substrate layer 4 is adjusted to be equal to or less than the upper limit mentioned above, thereby allowing the volumes of other constituent elements to be sufficiently secured.

(Negative Composite Layer)

The negative composite layer 5 can be formed from a so-called negative composite including a negative active material. The negative composite may contain a negative electrode mixture or a negative electrode composite containing the negative active material and the sulfide solid electrolyte. The negative composite contains, if necessary, optional components such as a solid electrolyte other than the sulfide solid electrolyte, a conductive agent, a binder, and a filler.

<Negative Active Material>

As the negative active material, a material capable of occluding and releasing lithium ions is typically used. Specific negative active materials include metallic lithium; metals or semimetals such as Si and Sn; metal oxides or semimetal oxides such as Si oxides and Sn oxides; polyphosphate compounds; carbon materials such as graphite, non-graphitic carbon (graphitizable carbon or non-graphitizable carbon); and lithium metal composite oxides such as lithium titanate.

The lower limit of the content of the negative active material in the negative composite is preferably 10% by mass, more preferably 15% by mass. The upper limit of the content of the negative active material is preferably 60% by mass, more preferably 70% by mass, further preferably 80% by mass, particularly preferably 90% by mass, and may be 95% by mass. The content of the negative active material falls within the range mentioned above, thereby allowing the electric capacity of the all-solid-state battery to be increased.

<Negative Electrode Mixture or Negative Electrode Composite>

The negative electrode mixture is a mixture prepared by mixing the negative active material and the sulfide solid electrolyte by mechanical milling or the like. For example, the mixture of the negative active material and the sulfide solid electrolyte can be obtained by mixing the particulate negative active material and the particulate sulfide solid electrolyte.

Examples of the negative electrode composite include a composite with a chemical or physical bond between the negative active material and the sulfide solid electrolyte, and a composite mechanically formed from the negative active material and the sulfide solid electrolyte. The composite mentioned above has the negative active material and the sulfide solid electrolyte present in one particle, and examples of the composite include an aggregate formed by the negative active material and the sulfide solid electrolyte, and the negative active material with a film containing the sulfide solid electrolyte, formed on at least a part of the surface of the material.

The negative electrode mixture or the negative composite may contain a solid electrolyte other than the sulfide solid electrolyte.

The negative active material and sulfide solid electrolyte contained in the negative composite constitute the negative electrode mixture or the negative electrode composite, thereby allowing the ion conductivity to be improved.

In the case where the negative composite contains a solid electrolyte, the lower limit of the content of the solid electrolyte in the negative composite may be 5% by mass, and is preferably 10% by mass. The upper limit of the content of the solid electrolyte in the negative composite is preferably 90% by mass, more preferably 85% by mass, further preferably 80% by mass, particularly preferably 75% by mass. The content of the solid electrolyte falls within the range mentioned above, thereby allowing the electric capacity of the all-solid-state battery to be increased. The negative composite may contain the sulfide solid electrolyte, or may contain a solid electrolyte other than the sulfide solid electrolyte.

<Other Optional Component>

The conductive agent mentioned above is not particularly limited. Examples of such a conductive agent include natural or artificial graphite, carbon black such as furnace black, acetylene black, and ketjen black, metals, and conductive ceramics. Examples of the form of the conductive agent include powdery and fibrous forms. The content of the conductive agent in the negative composite can be, for example, 0.5% by mass or more and 30% by mass or less. The negative composite may contain no conductive agent.

The binder (binding agent) mentioned above is not particularly limited. Examples of the binder include thermoplastic resins such as fluororesins (polytetrafluoroethylene (PTFE), polyvinylidene fluoride (PVDF), etc.), polyethylene, polypropylene, polyimide, and polyacrylic acid; elastomers such as an ethylene-propylene-diene rubber (EPDM), sulfonated EPDM, a styrene-butadiene rubber (SBR), and fluororubber; and polysaccharide polymers.

The filler mentioned above is not particularly limited. Examples of the main component of the filler include polyolefins such as polypropytpolypropylene and polyethylene, silica, alumina, zeolite, glass, and carbon.

The lower limit of the average thickness of the negative composite layer 5 is preferably 30 µm, more preferably 60 µm. The upper limit of the average thickness of the negative composite layer 5 is preferably 1000 µm, more preferably 500 µm, further preferably 200 µm. The average thickness of the negative composite layer 5 is adjusted to be equal to or more than the lower limit mentioned above, thereby making it possible to obtain an all-solid-state battery with a high energy density. The average thickness of the negative composite layer 5 is adjusted to be equal to or less than the upper limit mentioned above, thereby making it possible to obtain an all-solid-state battery including a negative electrode that is excellent in rate characteristics and high in active material utilization.

(Intermediate Layer)

The intermediate layer mentioned above, which is a coating layer on the surface of the negative electrode substrate layer 4, includes conductive particles such as carbon particles, thereby reducing the contact resistance between the negative electrode substrate layer 4 and the negative composite layer 5. The structure of the intermediate layer is not particularly limited, and can be formed from, for example, a composition containing a resin binder and conductive particles.

[Positive Electrode Layer]

The positive electrode layer 2 includes the positive electrode substrate layer 7 and the positive composite layer 6 stacked on the surface of the positive electrode substrate layer 7. Like the negative electrode layer 1, the positive electrode layer 2 may have an intermediate layer between the positive electrode substrate layer 7 and the positive composite layer 6. This intermediate layer may have the same structure as the intermediate layer of the negative electrode layer 1.

(Positive Electrode Substrate Layer)

The positive electrode substrate layer 7 may have the same structure as the negative electrode substrate layer 4. The material of the positive electrode substrate layer 7 is not limited as long as the material is a conductor. Examples of the material can include one or more metals selected from the group consisting of copper, aluminum, titanium, nickel, tantalum, niobium, hafnium, zirconium, zinc, tungsten, bismuth, antimony gold, silver, iron, platinum, chromium, tin, and indium, and alloys containing one or more of these metals, as well as stainless-steel alloys.

The lower limit of the average thickness of the positive electrode substrate layer 7 is preferably 3 µm, more preferably 5 µm. The upper limit of the average thickness of the positive electrode substrate layer 7 is preferably 200 µm, more preferably 100 µm, further preferably 50 µm. The average thickness of the positive electrode substrate layer 7 is adjusted to be equal to or more than the lower limit mentioned above, thereby allowing the strength of the positive electrode substrate layer 7 to be sufficiently increased, and thus allowing the positive electrode layer 2 to be formed favorably. The average thickness of the positive electrode substrate layer 7 is adjusted to be equal to or less than the upper limit mentioned above, thereby allowing the volumes of the other constituent elements to be sufficiently secured.

(Positive Composite Layer)

The positive composite layer 6 can be formed from a so-called positive composite including a positive active material. The positive composite may contain a positive electrode mixture or a positive electrode composite including a positive active material and a solid electrolyte. The sulfide solid electrolyte may be used as the solid electrolyte mentioned above. Like the negative composite, the positive composite that forms the positive composite layer 6 includes optional components such as a solid electrolyte, a conductive agent, a binder, and a filler, if necessary. It is to be noted that the positive composite layer may have a form containing no solid electrolyte.

<Positive Active Material>

As the positive active material included in the positive composite layer 6, known materials typically for use in all-solid-state batteries can be used. Examples of the positive active material include composite oxides represented by $Li_xMeO_y$ (Me represents at least one transition metal) ($Li_xCoO_2$, $Li_xNiO_2$, $Li_xMnO_3$, $Li_xNi_\alpha Co_{(1-\alpha)}O_2$, $Li_xNi_\alpha Mn_\beta Co_{(1-\alpha-\beta)}O_2$, and the like that have a layered α-NaFeO$_2$-type crystalline structure, and $Li_xMn_2O_4$, $Li_xNi_\alpha Mn_{(2-\alpha)}O_4$, and the like that have a spinel-type crystalline structure), and polyanion compounds represented by $Li_wMe_x(AO_y)_z$ (Me represents at least one transition metal, and A represents, for example, P, Si V, or the like) ($LiFePO_4$, $LiMnPO_4$, $LiNiPO_4$, $LiCoPO_4$, $Li_3V_2(PO_4)_3$, $Li_2MnSiO_4$, $Li_2CoPO_4F$, and the like) The elements or polyanions in these compounds may be partially substituted with other elements or anion species. In the positive active material layer, one of these compounds may be used alone, or two or more of these compounds may be used in mixture.

Lithium alloys such as Li—Al, Li—In, Li—Sn, Li—Pb, Li—Bi, Li—Ga; Li—Sr, Li—Si, Li—Zn, Li—Cd, Li—Ca, and Li—Ba, and materials that are more electropositive in oxidation-reduction potential than the negative electrode material, other than the compounds represented by the general formulas mentioned above, such as $MnO_2$, $FeO_2$, $TiO_2$, $V_2O_5$, $V_6O_{13}$, and $TiS_2$ can be used as the positive active material.

The lower limit of the content of the positive active material in the positive composite is preferably 10% by mass, more preferably 15% by mass. The upper limit of the content of the positive active material is preferably 60% by mass, more preferably 70% by mass, further preferably 80% by mass, particularly preferably 90% by mass, and may be 95% by mass. The content of the positive active material falls within the range mentioned above, thereby allowing the electric capacity of the all-solid-state battery to be increased.

<Positive Electrode Mixture or Positive Electrode Composite>

The positive electrode mixture is a mixture prepared by mixing the positive active material and a solid electrolyte or the like by mechanical milling or the like, as in the case of the negative electrode. For example, the mixture of the positive active material and the solid electrolyte or the like can be obtained by mixing the particulate positive active material and the particulate solid electrolyte or the like.

Examples of the positive electrode composite also include, as in the case of the negative electrode, a composite with a chemical or physical bond between the positive active material and the solid electrolyte or the like, and a composite mechanically formed from the positive active material and the solid electrolyte or the like. The composite mentioned above has the positive active material and the solid electrolyte or the like present in one particle, and examples of the composite include an aggregate formed by the positive active material and the solid electrolyte or the like, and the positive active material with a film containing the solid electrolyte or the like, formed on at least a part of the surface of the material.

The positive electrode mixture or the positive electrode composite may contain a solid electrolyte other than the sulfide solid electrolyte.

The positive active material and the solid electrolyte or the like contained in the positive composite constitute the positive electrode mixture or the positive electrode composite, thereby allowing the ion conductivity to be improved.

In the case where the positive composite contains a solid electrolyte, the lower limit of the content of the solid electrolyte may be 5% by mass, and is preferably 10% by mass. The upper limit of the content of the solid electrolyte in the positive composite is preferably 90% by mass, more preferably 85% by mass, further preferably 80% by mass, particularly preferably 75% by mass. The content of the solid electrolyte falls within the range mentioned above, thereby allowing the electric capacity of the all-solid-state battery to be increased.

The lower limit of the average thickness of the positive composite layer 6 is preferably 30 μm, more preferably 60 μm. The upper limit of the average thickness of the positive composite layer 6 is preferably 1000 μm, more preferably 500 μm further preferably 200 μm. The average thickness of the positive composite layer 6 is adjusted to be equal to or more than the lower limit mentioned above, thereby making it possible to obtain an all-solid-state battery with a high energy density. The average thickness of the positive composite layer 6 is adjusted to be equal to or less than the upper limit mentioned above, thereby making it possible to obtain an all-solid-state battery including a negative electrode that is excellent in high rate discharge performance and high in active material utilization.

[Solid Electrolyte Layer]

The solid electrolyte layer 3 contains an electrolyte for solid electrolyte layers. Examples of the electrolyte for solid electrolyte layers can include oxide-based solid electrolytes, other sulfide solid electrolytes, dry polymer electrolytes, gel polymer electrolytes, and pseudo solid electrolytes, besides the sulfide solid electrolyte described above. Among these electrolytes, from viewpoints such as favorable ion conductivity and easy interface formation, sulfide solid electrolytes are preferable, and the sulfide solid electrolyte described above is more preferable. The solid electrolyte layer 3 contains the sulfide solid electrolyte, thereby allowing the solid electrolyte layer to exhibit a high ion conductivity, and thus allowing the internal resistance of the all-solid-state battery to be reduced.

The content of the sulfide solid electrolyte with respect to the total amount of the solid electrolytes included in the all-solid-state battery is preferably 50% by mass or more and 100% by mass or less, more preferably 70% by mass or more and 100% by mass or less, further preferably 80% by mass or more and 100% by mass or less, even more preferably 90% by mass or more and 100% by mass or less. In particular, the solid electrolyte included in the all-solid-state battery is preferably composed only of the sulfide solid electrolyte.

In particular, since the sulfide solid electrolyte containing the element X has high thermal stability, the all-solid-state battery configured as mentioned above makes it possible to fully enjoy the advantage of the all-solid-state battery that allows the raised upper limit of the operating temperature of the battery.

The electrolyte for solid electrolyte layers may have a crystalline structure, or may be amorphous without having a crystalline structure. Oxides such as $Li_3PO_4$, halogens, halogen compounds, and the like may be added to the electrolyte for solid electrolyte layers.

The average thickness of the solid electrolyte layer 3 is preferably 1 μm or more and 50 μm or less, more preferably 3 μm or more and 20 μm or less. The average thickness of the solid electrolyte layer 3 falls within the range mentioned above, thereby making it possible to reliably insulate the positive electrode and the negative electrode while increasing the energy density of the all-solid-state battery.

<Method for Manufacturing All-Solid-State Battery>

The method for manufacturing the all-solid-state battery mainly includes, for example, a sulfide solid electrolyte preparation step, a negative composite preparation step, a step of preparing an electrolyte for solid electrolyte layers, a positive composite preparation step, and a stacking step of stacking a negative electrode layer, a solid electrolyte layer, and a positive electrode layer.

(Sulfide Solid Electrolyte Preparation Step)

In this step, for example, a sulfide solid electrolyte is prepared by the method for producing a sulfide solid electrolyte.

(Negative Composite Preparation Step)

In this step, a negative composite for forming the negative electrode layer is prepared. In the case where the negative composite contains a mixture or a composite including the negative active material and the sulfide solid electrolyte, this step includes, for example, using a mechanical milling method or the like to mix the negative active material and the sulfide solid electrolyte and prepare a mixture or a composite of the negative active material and the sulfide solid electrolyte.

(Step of Preparing Electrolyte for Solid Electrolyte Layer)

In this step, the electrolyte for solid electrolyte layers for forming the solid electrolyte layer is prepared. In this step, the electrolyte can be obtained through treatment of predetermined materials for the electrolyte for solid electrolyte layers by a mechanical milling method. The electrolyte for solid electrolyte layers may be prepared by heating predetermined materials for the electrolyte for solid electrolyte layers to the melting temperature or higher to melt and mix the both materials at a predetermined ratio and quench the mixture in accordance with a melt quenching method. Other methods for synthesizing the electrolyte for solid electrolyte layers include a solid phase method of sealing under reduced pressure and firing, a liquid phase method such as dissolution-precipitation, a gas phase method (PLD), and firing under an argon atmosphere after mechanical milling. It is to be noted that in the case where the electrolyte for solid electrolyte layers is the sulfide solid electrolyte, the above-mentioned sulfide solid electrolyte preparation step is performed in the step for preparing the electrolyte for solid electrolyte layers.

(Positive Composite Preparation Step)

In this step, a positive composite for forming the positive electrode layer is prepared. The method for preparing the positive composite is not particularly limited, and may be selected appropriately depending on the purpose. Examples of the method include compression molding of the positive active material, mechanical milling treatment of predetermined materials for the positive composite, and sputtering with a target material for the positive active material. In the case where the positive composite contains a mixture or a composite including the positive active material and the sulfide solid electrolyte, this step includes, for example, using a mechanical milling method or the like to mix the positive active material and the sulfide solid electrolyte and prepare a mixture or a composite of the positive active material and the sulfide solid electrolyte.

(Stacking Step)

In this step, the negative electrode layer including the negative electrode substrate layer and the negative composite layer, the solid electrolyte layer, and the positive electrode layer including the positive electrode substrate layer and the positive composite layer are stacked. In this step, the negative electrode layer, the solid electrolyte layer, and the positive electrode layer may be formed in sequence, or vice versa, and the order of forming the respective layers is not particularly limited. The negative electrode layer is formed by pressure molding of the negative electrode substrate and the negative composite, the solid electrolyte layer is formed by pressure molding of the electrolyte for solid electrolyte layers, and the positive electrode layer is formed by pressure molding of the positive electrode substrate and the positive composite.

The negative electrode layer, the solid electrolyte layer, and the positive electrode layer may be stacked by pressure molding of the negative electrode substrate, the negative composite, the electrolyte for solid electrolyte layers, the positive electrode substrate, and the positive composite at the same time. The positive electrode layer, the negative electrode layer, or these layers may be molded in advance, and subjected to pressure molding with the solid electrolyte layer to stack the layers.

Other Embodiments

The present invention is not to be considered limited to the embodiment mentioned above, and can be put into practice in various modified and improved aspects, besides the aspects mentioned above.

Although the raw material compound containing N, element A, and element M has been described with reference to the raw material compound containing only N, Li, and the element M as an example in the above embodiment, the present invention is not limited thereto. For example, the raw material compound containing N, element A, and the element M may further contain other elements as long as the present invention can solve the problems.

The configuration of the all-solid-state battery according to the present invention is not to be considered particularly limited, and may include other layers such as an intermediate layer and an adhesive layer, besides the negative electrode layer, the positive electrode layer, and the solid electrolyte layer.

EXAMPLES

Hereinafter, the present invention will be described more specifically with reference to demonstration experiments, but the present invention is not limited to the following examples.

First, the effect of suppressing the discharge of N to the outside of the system, achieved by the method for producing a sulfide solid electrolyte according to an embodiment of the present invention, will be shown with reference to Example 1, Example 2, Comparative Example 1, Comparative Example 2, and Comparative Example 3.

Example 1

$80(0.70Li_2S \cdot 0.30P_2S_5) \cdot 20Li_{3/2}Al_{1/2}N$ was synthesized by the following treatment.

(Preparation Step)

$Li_3N$ and AlN were weighed so as to be 1.2:1 in terms of mole ratio, mixed in a mortar, and then pelletized. Next, $Li_{3/2}Al_{1/2}N$ was prepared by heat treatment at 750° C. for 1 hour. It was confirmed by XRD measurement that the main phase of the prepared $Li_{3/2}Al_{1/2}N$ was $Li_{3/2}Al_{1/2}N$.

Next, in a glove box in an argon atmosphere with a dew point of −50° C. or lower, Li$_2$S (99.98%, Aldrich), P$_2$S$_5$ (99%. Aldrich), and Li$_{3/2}$Al$_{1/2}$N were weighed so as to be 56:24:20 in terms of mole ratio, and then mixed in a mortar to prepare a composition containing Li, P, S, N, and Al,
(Reaction Step)

The above-mentioned composition was put in a hermetically sealed 80 mL zirconia pot containing 160 g of zirconia balls with a diameter of 4 mm. The sample was subjected to milling treatment for 45 hours at a revolution speed of 510 rpm with a planetary ball mill (from FRITSCH, model number: Premium line P-7), thereby providing an intermediate.
(Heat Treatment Step)

The above-mentioned intermediate was subjected to a heat treatment for 2 hours to obtain a sulfide solid electrolyte. This heat treatment was performed at a temperature that was equal to or higher than the crystallization temperature and not 100° C. higher than the crystallization temperature. The crystallization temperature was determined by measuring the DSC. The DSC measurement was made under the following conditions. More specifically, the temperature was raised from room temperature to 400° C. at 10° C./min with the use of a DSC device (Thermo Plus DSC8230 from Rigaku Corporation) and a hermetically sealed pan made of SUS.

The composition, intermediate, and sulfide solid electrolyte prepared in accordance with the above-mentioned synthesis procedure were respectively referred to as a sample a, a sample b, and a sample c.

Example 2

80(0.70Li$_2$S·0.30P$_2$S$_5$)·20Li$_{3/2}$B$_{1/2}$N was synthesized similarly to Example 1 except that the preparation step was changed as follows.
(Preparation Step)

Li$_3$N and BN were weighed so as to be 1.1:1 in terms of mole ratio, mixed in a mortar, and then pelletized. Next, Li$_{3/2}$B$_{1/2}$N was prepared by heat treatment at 800° C. for 10 minutes. It was confirmed by XRD measurement that the main phase of the prepared Li$_{3/2}$B$_{1/2}$N was Li$_{3/2}$B$_{1/2}$N.

Next, in a glove box in an argon atmosphere with a dew point of −50° C. or lower, Li$_2$S (99.98%, Aldrich), P$_2$S$_5$ (99%, Aldrich), and Li$_{3/2}$B$_{1/2}$N were weighed so as to be 56:24:20 in terms of mole ratio, and then mixed in a mortar to prepare a composition containing Li, P, S, N, and B.

Comparative Example 1

56.8Li$_2$S·27.0P$_2$S$_5$·16.2Li$_3$N was synthesized similarly to Example 1 except that the preparation process was changed as follows.
(Preparation Step)

In a glove box in an argon atmosphere with a dew point of −50° C. or lower, Li$_2$S (99.98%, Aldrich), P$_2$S$_5$ (99%, Aldrich), and Li$_3$N were weighed so as to be 56.8:27.0:16.2 in terms of mole ratio, and then mixed in a mortar to prepare a composition containing Li, P, S, and N.

Comparative Example 2

80(0.70Li$_2$S·0.30P$_2$S$_5$)·20Li$_{3/2}$Al$_{1/2}$N was synthesized similarly to Example 1 except that the preparation step was changed as follows.
(Preparation Step)

In a glove box in an argon atmosphere with a dew point of −50° C. or lower, Li$_2$S (99.98%, Aldrich), P$_2$S$_5$ (99%, Aldrich), Li$_3$N, and AlN were weighed so as to be 56:24:10:10 in terms of mole ratio, and then mixed in a mortar to prepare a composition containing Li, P, S, N, and Al.

Comparative Example 3

80(0.70Li$_2$S·0.30P$_2$S$_5$)·20Li$_{7/4}$V$_{1/4}$N was synthesized similarly to Example 1 except that the preparation step was changed as follows.
(Preparation Step)

Li$_3$N and VN were weighed so as to be 3:1 in terms of mole ratio, mixed in a mortar, and then pelletized. Next, Li$_{7/4}$V$_{1/4}$N was prepared by heat treatment at 750° C. for 10 hours. It was confirmed by XRD measurement that the main phase of the prepared Li$_{7/4}$V$_{1/4}$N was Li$_{7/4}$V$_{1/4}$N.

Next, in a glove box in an argon atmosphere with a dew point of −50° C. or lower, Li$_2$S (99.98%, Aldrich), P$_2$S$_5$ (99%, Aldrich), and Li$_{7/4}$V$_{1/4}$N were weighed so as to be 56:24:20 in terms of mole ratio, and then mixed in a mortar to prepare a composition containing Li, P, S, N, and V
[Evaluation]
(1) XRD X-ray diffraction measurement was made by the following method. With the use of airtight sample holder for X-ray diffraction measurement, the sulfide solid electrolyte powders according to the examples and comparative examples were packed under an argon atmosphere with a dew point of −50° C. or lower. Powder X-ray diffraction measurement was made with the use of an X-ray diffractometer ("miniFlex II" from Rigaku Corporation). The radiation source was a CuKα line, the tube voltage was 30 kV the tube current was 15 mA, and diffracted X-rays were detected by a high-speed one-dimensional detector (model number: D/teX Ultra 2) through a Kβ filter with a thickness of 30 μm. The sampling width was 0.01°, the scan speed was 5°/min, the divergent slit width was 0.625°, the light receiving slit width was 13 mm (OPEN and the scattering slit width was 8 mm.
(2) Ion Conductivity (σ)

For the ion conductivity (σ$_{25}$), the ion conductivity at 25° C. was determined by measuring the alternating-current impedance with the use of "VMP-300" from (Bio-Logic) in accordance with the method described above. It is to be noted that for some of the examples and comparative examples, the ion conductivity was also measured at each temperature of −30° C., −20° C., −10° C., 0° C., and 50° C., and the activation energy (E$_a$) was calculated by the Arrhenius equation.

Figure 4:
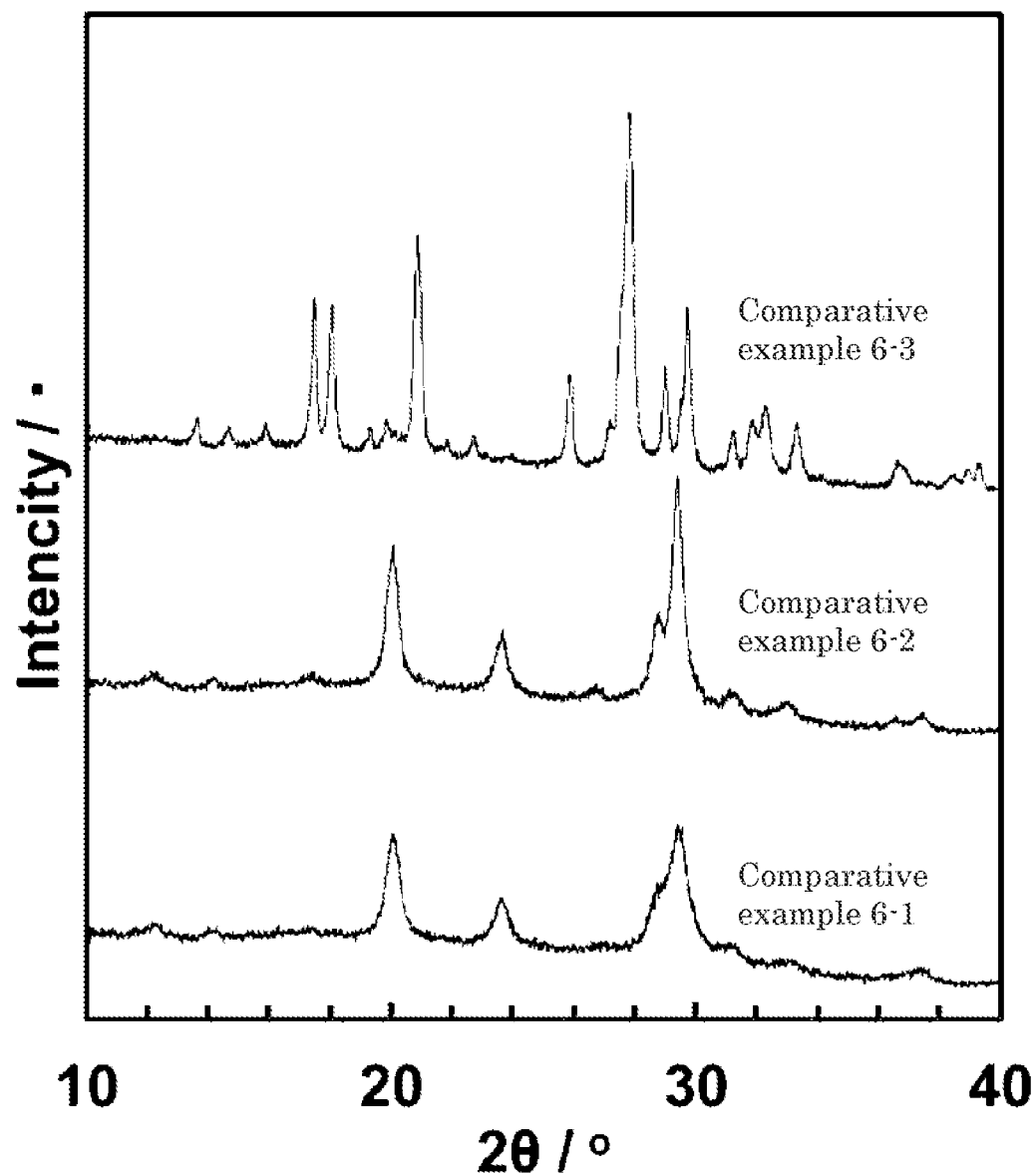
FIG. 4 shows XRD diffraction patterns of sulfide solid electrolytes according to comparative examples.

Table 4 shows the XRD patterns and the ion conductivity (σ$_{25}$) at 25° C. for Example 1, Example 2, Comparative Example 1, Comparative Example 2, and Comparative Example 3. As shown in FIG. 4, it has been confirmed that the sulfide solid electrolytes according to all of the examples and comparative examples have peaks observed in the XRD spectra, and have the specific crystalline structure A. It is to be noted that the specific crystalline structure A is a crystalline structure that has diffraction peaks at 2θ=17.9°±0.5°, 19.1°±0.5°, 29.1°±0.5°, 29.8°±0.5°, and 30.9°±0.5° in X-ray diffraction measurement. In addition, it has been confirmed that the sulfide solid electrolytes according to Example 1, Example 2, and Comparative Example 3 show the same level of ion conductivity.

Thus, Example 1, Example 2, Comparative Example 1, Comparative Example 2, and Comparative Example 3 can be considered to have similar structures.

TABLE 4

| | Crystalline Structure derived from XRD Spectrum | Ion Conductivity $\sigma_{25}$ (S/cm) |
|---|---|---|
| Example 1 | Specific Crystalline Structure A | $1.7 \times 10^{-3}$ |
| Example 2 | Specific Crystalline Structure A | $1.5 \times 10^{-3}$ |
| Comparative Example 1 | Specific Crystalline Structure A | — |
| Comparative Example 2 | Specific Crystalline Structure A | — |
| Comparative Example 3 | Specific Crystalline Structure A | $1.5 \times 10^{-3}$ |

For each of the samples according to Example 1, Example 2, Comparative Example 1 and Comparative Example 2, the contents of Li, B, Al, and P in the sample were determined with the use of an ICP emission spectrophotometer. In addition, for each of the samples according to Example 1, Example 2, and Comparative Examples 1 to 3, the content of N in the sample was determined with the use of an oxygen/nitrogen/hydrogen analyzer. From this analysis result, the rate of change in the content ratio of N in the sample was calculated. Table 5 shows the analysis results. It is to be noted that "no change" in the table indicates that the rate of change in the content ratio of N for the sample a was ±5% by mass or less.

TABLE 5

| | | Content Ratio of N in Sample/ % by mass | Rate of Change in Content Ratio of N for Sample a/ % |
|---|---|---|---|
| Example 1 | Sample a | 3.3 | — |
| | Sample b | 3.1 | No change |
| | Sample c | 3.2 | No change |
| Example 2 | Sample a | 2.7 | — |
| | Sample b | 2.8 | No change |
| | Sample c | 2.7 | No change |
| Comparative Example 1 | Sample a | 3.0 | — |
| | Sample b | 2.0 | 69 |
| | Sample c | 1.8 | 60 |
| Comparative Example 2 | Sample a | 2.6 | — |
| | Sample b | 2.2 | 82 |
| | Sample c | 2.1 | 78 |
| Comparative Example 3 | Sample a | 2.8 | — |
| | Sample b | 1.7 | 68 |
| | Sample c | 1.4 | 56 |

From Table 5, it is determined that Example 1 and Example 2 undergo extraordinarily little change in the content ratio of N in the sample a, the sample b, and the sample c. More specifically, it is determined that Example 1 and Example 2 undergo extraordinarily little change in the content of N even through each step of the reaction step and the heat treatment step, thereby suppressing the discharge of N to the outside of the system.

In contrast, it is determined that the content ratios of N in the sample a, the sample b, and the sample c decrease in the order of the sample a, the sample b, and the sample c in Comparative Example 1, Comparative Example 2 and Comparative Example 3. More specifically, it is determined that in Comparative Example 1, Comparative Example 2, and Comparative Example 3, the content of N decreases with each step of the reaction step and the heat treatment step, thereby resulting in discharge of N to the outside of the system.

From the foregoing, it has been demonstrated that effects are actually achieved for Al and B selected by predicting the effect of suppressing the discharge of N with the use of the first-principle calculation. Furthermore, it has been also demonstrated that no effect is actually achieved for V predicted to fails to achieve the effect of suppressing the discharge of N with the use of the first principle calculation.

Next, the effect of improving the thermal stability of the sulfide solid electrolyte according to an embodiment of the present invention will be shown with reference to Examples 3 to 20 and Comparative Examples 4 to 8.

Example 3

A sulfide solid electrolyte represented by the compositional formula $85(0.80(0.70Li_2S \cdot 0.30P_2S_5) \cdot 0.20Li_{3/2}Al_{1/2}N) \cdot 10LiBr \cdot 5LiI$ was synthesized by the following treatment.

$Li_3N$ and, AlN were weighed so as to be 1.2:1 in terms of mole ratio, mixed in a mortar, and then pelletized. Next, $Li_{3/2}Al_{1/2}N$ was prepared by heat treatment at 750° C. for 1 hour. It was confirmed by XRD measurement that the main phase of the prepared $Li_{3/2}Al_{1/2}N$ was $Li_{3/2}Al_{1/2}N$.

Next, in a glove box in an argon atmosphere with a dew point of −50° C. or lower, $Li_2S$ (99.98%, Aldrich), $P_2S_5$ (99%, Aldrich), LiBr (99.999%, Aldrich), LiI (99.999%, Aldrich), and $Li_{3/2}Al_{1/2}N$ were weighed so as to be 47.6:20.4:10:5:17 in terms of mole ratio, and then mixed in a mortar. This mixed sample was put in a hermetically sealed 80 mL zirconia pot containing 160 g of zirconia balls with a diameter of 4 mm. The sample was subjected to milling for 45 hours at a revolution speed of 510 rpm with a planetary ball mill (from FRITSCH, model number: Premium line P-7). The milled sample was subjected to a heat treatment at 245° C. for 2 hours to obtain a sulfide solid electrolyte according to Example 3. This heat treatment temperature was set so as to be equal to or higher than the crystallization temperature, and so as not to be 100° C. higher than the crystallization temperature. The crystallization temperature was determined by retrieving a part of the sample after the milling treatment and subjecting the part to DSC measurement. The DSC measurement was made under the following conditions. More specifically, the temperature was raised from room temperature to 400° C. at 10° C./min with the use of a DSC device (Thermo Plus DSC8230 from Rigaku Corporation) and a hermetically sealed pan made of SUS.

Comparative Example 4, Comparative Example 5

Sulfide solid electrolytes according to Comparative Example 4 and Comparative Example 5 were synthesized similarly to Example 3 except that the compositions of the sulfide solid electrolytes were changed to $85(0.75Li_2S \cdot 0.25P_2S_5) \cdot 10LiBr \cdot 5LiI$ and $85(0.72Li_2S \cdot 0.25P_2S_5 \cdot 0.020Li_3N) \cdot 10LiBr \cdot 5LiI$, and that the heat treatment temperatures were both set to 225° C.

Examples 4 to 7, Comparative Example 6

Sulfide solid electrolytes according to Examples 4 to 7 and Comparative Example 6 were synthesized similarly to Example 3 except that the compositions of the sulfide solid electrolytes were changed to $80(0.80(0.70Li_2S \cdot 0.30P_2S_5) \cdot 0.20Li_{3/2}Al_{1/2}N) \cdot 12LiBr \cdot 8LiI$, $80(0.70(0.67Li_2S \cdot 0.33P_2S_5) \cdot 0.30Li_{3/2}Al_{1/2}N) \cdot 12LiBr \cdot 8LiI$, $80(0.80(0.70Li_2S \cdot 0.30P_2S_5) \cdot 0.20Li_{3/2}B_{1/2}N) \cdot 12LiBr \cdot 8LiI$, $80(0.80(0.70Li_2S \cdot 0.30P_2S_5) \cdot 0.20Li_{5/3}Si_{1/3}N) \cdot 12LiBr \cdot 8LiI$, and $80(0.6975Li_2S \cdot 0.25P_2S_5 \cdot 0.035Li_3N) \cdot 12LiBr \cdot 8LiI$, and that the heat treatment temperatures were respectively set to 255° C., 275° C., 270° C., 270° C., and 250° C.

Further, as for the sulfide solid electrolyte according to Example 4, samples obtained at the heat treatment temperatures of 215° C., 230° C., 275° C., 290° C., and 310° C. were also synthesized in addition to the sample obtained at the heat treatment temperature of 255° C. As for the sulfide solid electrolyte according to Example 5, samples obtained at the heat treatment temperatures of 235° C., 290° C., 310° C., and 330° C. were also synthesized in addition to the sample obtained at the heat treatment temperature of 275° C. As for the sulfide solid electrolyte according to Example 6, samples obtained at the heat treatment temperatures of 230° C., 270° C., 290° C. 310° C., and 330° C. were also synthesized in addition to the sample obtained at the heat treatment temperature of 270° C. As for the sulfide solid electrolyte according to Example 7, samples obtained at the heat treatment temperatures of 230° C., 290° C., 310° C. and 330° C. were also synthesized in addition to the sample obtained at the heat treatment temperature of 270° C. Furthermore, as for the sulfide solid electrolyte according to Comparative Example 6, samples obtained at the heat treatment temperatures of 210° C. and 230° C. were also synthesized in addition to the sample obtained at the heat treatment temperature of 250° C.

The sulfide solid electrolytes synthesized at the respective heat treatment temperatures are respectively referred to as Example 4-1 to Example 4-6. Example 5-1 to Example 5-5, Example 6-1 to Example 6-5, Example 7-1 to Example 7-5, and Comparative Example 6-1 to Comparative Example 6-3 in ascending order of heat treatment temperature.

Example 8, Comparative Example 7

Sulfide solid electrolytes according to Example 8 and Comparative Example 7 were synthesized similarly to Example 1 except that the compositions of the sulfide solid electrolytes were changed to $75(0.80(0.70Li_2S\cdot0.30P_2S\cdot0.30P_2S_5)\cdot0.20Li_{3/2}Al_{1/2}N)\cdot15LiBr\cdot10LiI$ and $75(0.72Li_2S\cdot0.25P_2S_5\cdot0.020Li_3N)\cdot15LiBr\cdot10LiI$ and that the heat treatment temperatures were respectively set to 21.5° C. and 195° C.

Examples 9 to 11, Comparative Example 8

Sulfide solid electrolytes according to Example 9, Example 10, Example 11, and Comparative Example 8 were synthesized similarly to Example 3 except that the compositions of the sulfide solid electrolytes were changed to $90(0.80(0.70Li_2S\cdot0.30P_2S_5)\cdot0.20Li_{3/2}Al_{1/2}N)\cdot10LiBr$, $80(0.80(0.70Li_2S\cdot0.30P_2S_5)\cdot0.20Li_{3/2}Al_{1/2}N)\cdot20LiBr$, $70(0.80(0.70Li_2S\cdot0.30P_2S_5)\cdot0.20Li_{3/2}Al_{1/2})\cdot30LiBr$, and $90(0.72Li_2S\cdot0.25P_2S_5\cdot0.020Li_3N)\cdot10LiBr$, and that the heat treatment temperatures were respectively set to 265° C., 250° C., 240° C., and 225° C.

Example 12, Example 13

Sulfide solid electrolytes according to Example 12 and Comparative Example 13 were synthesized similarly to Example 3 except that the compositions of the sulfide solid electrolytes were changed to $90(0.80(0.70Li_2S\cdot0.30P_2S_5)\cdot0.20Li_{3/2}Al_{1/2}N)\cdot10LiI$ and $80(0.80(0.7Li_2S\cdot0.30P_2S_5)\cdot0.20Li_{3/2}Al_{1/2}N)\cdot20LiI$ and that the heat treatment temperatures were respectively set to 255° C. and 240° C.

Examples 14 to 17

Sulfide solid electrolytes according to Examples 14 to 17 were synthesized similarly to Example 3 except that the compositions of the sulfide solid electrolytes were changed to $80(0.97(0.745Li_2S\cdot0.255P_2S_5)\cdot0.03Li_{3/2}B_{1/2}N)\cdot12LiBr\cdot8LiI$, $80(0.95(0.74Li_2S\cdot0.26P_2S_5)\cdot0.05Li_{3/2}B_{1/2}N)\cdot12LiBr\cdot8LiI$, $80(0.90(0.73Li_2S\cdot0.27P_2S_5)\cdot0.10Li_{3/2}B_{1/2}N)\cdot12LiBr\cdot8LiI$, and $80(0.85(0.715Li_2S\cdot0.285P_2S_5)\cdot0.15Li_{3/2}B_{1/2}N)\cdot12LiBr\cdot8LiI$, and that the heat treatment temperatures were each set to 250° C.

Examples 18 to 20

Sulfide solid electrolytes according to Examples 18 to 20 were synthesized similarly to Example 3 except that the compositions of the sulfide solid electrolytes were changed to $75(0.80(0.70Li_2S\cdot0.30P_2S_5)\cdot0.20Li_{3/2}B_{1/2}N)\cdot15LiBr\cdot10LiI$, $70(0.80(0.70Li_2S\cdot0.30P_2S_5)\cdot0.20Li_{3/2}B_{1/2}N)\cdot17LiBr\cdot13LiI$, and $65(0.80(0.70Li_2S\cdot0.30P_2S_5)\cdot0.20Li_{3/2}B_{1/2}N)\cdot20LiBr\cdot15LiI$, and that the heat treatment temperatures were respectively set to 230° C., 195° C., and 185° C.

The sulfide solid electrolytes according to Examples 3 to 20 are represented by the general formulas $(100-z_1-z_2)\{(1-y)[xLi_2S\cdot(1-x)P_2S_5]\cdot yLi_\alpha M_\beta N\}\cdot z_1 LiX_1\cdot z_2 LiX_2$. The sulfide solid electrolytes according to Comparative Examples 5 to 7 are represented by the general formulas $(100-z_1-z_2)\{(x-1.5y)Li_2S\cdot(1-x)P_2S_5\cdot yLi_3N\}\cdot z_1 LiX_1\cdot z_2 LiX_2$.

Tables 6 to 12 show the crystalline structures identified from the XRD patterns of Examples 3 to 20 and Comparative Examples 4 to 8. Table 13 shows the crystalline structures identified from the XII) patterns of Examples 4-1 to 4-6, Examples 5-1 to 5-5, Examples 6-1 to 6-5, Examples 7-1 to 7-5, and Comparative Examples 6-1 to 6-3.

It is to be noted that the "HICP" in the tables represents a crystal phase that has diffraction peaks at $2\theta=20.2°\pm0.5°$ and $23.6°\pm0.5°$ in X-ray diffraction measurement with a CuKα line. The "LICP" therein represents a crystal phase that has diffraction peaks at $2\theta=21.0°\pm0.5°$ and $28.0°\pm0.5°$ in X-ray diffraction measurement with a CuKα line. The "specific crystalline structure C" represents a crystal phase that has diffraction peaks at $2\theta=17.5°\pm0.5°$ and $24.9°\pm0.5°$ in X-ray diffraction measurement with a CuKα line. The "β-$Li_3PS_4$" represents a crystal phase that has diffraction peaks at $2\theta=17.5°\pm0.5°$, $18.1°\pm0.5°$, $29.1°\pm0.5°$, $29.9°\pm0.5°$, and $31.2°\pm0.5°$ in X-ray diffraction measurement with a CuKα line. The "Unknown" represents a peak from which the crystal phase is unknown.

Figure 3:
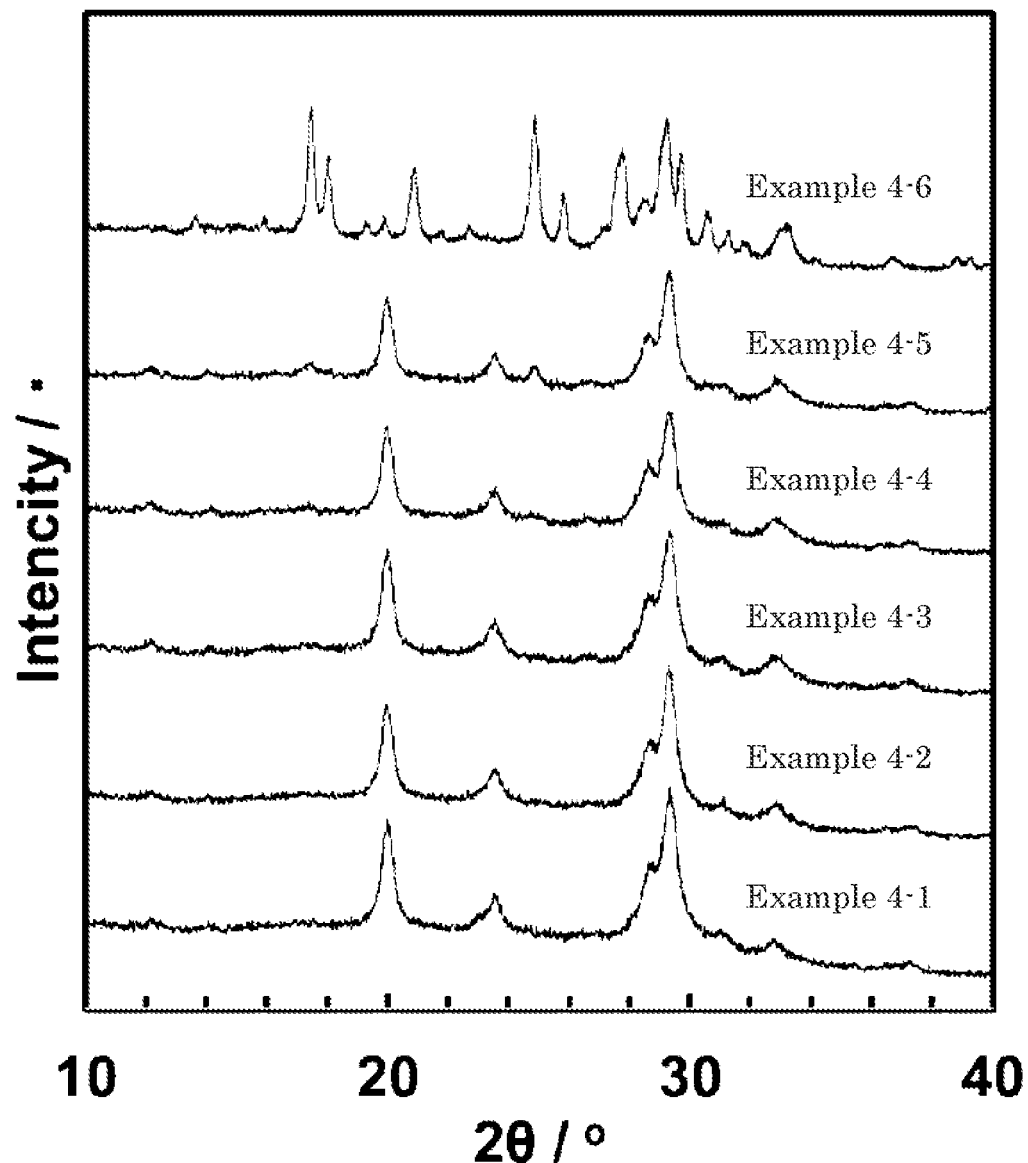
FIG. 3 shows XRD diffraction patterns of sulfide solid electrolytes according to examples.

In addition, FIG. 3 shows the XRD patterns of Examples 4-1 to 4-6, FIG. 4 shows the XRD patterns of Comparative Examples 6-1 to 6-3.

Tables 6 to 12 show the ion conductivity ($\sigma_{25}$) at 25° C. and the activation energy ($E_a$) for Examples 3 to 20 and Comparative Examples 4 to 8. Table 1.3 shows the ion conductivity ($\sigma_{25}$) at 25° C. and activation energy ($E_a$) for Examples 4-1 to 4-6, Examples 5-1 to 5-5, Examples 6-1 to 6-5, Examples 7-1 to 7-5, and Comparative Examples 6-1 to 6-3.

(3) DSC

DSC measurement was made by the following method. The temperature was raised from room temperature to 400° C. at 10° C./min with the use of a DSC device (Thermo Plus DSC8230 from Rigaku Corporation) and a hermetically sealed pan made of SUS.

Figure 5:
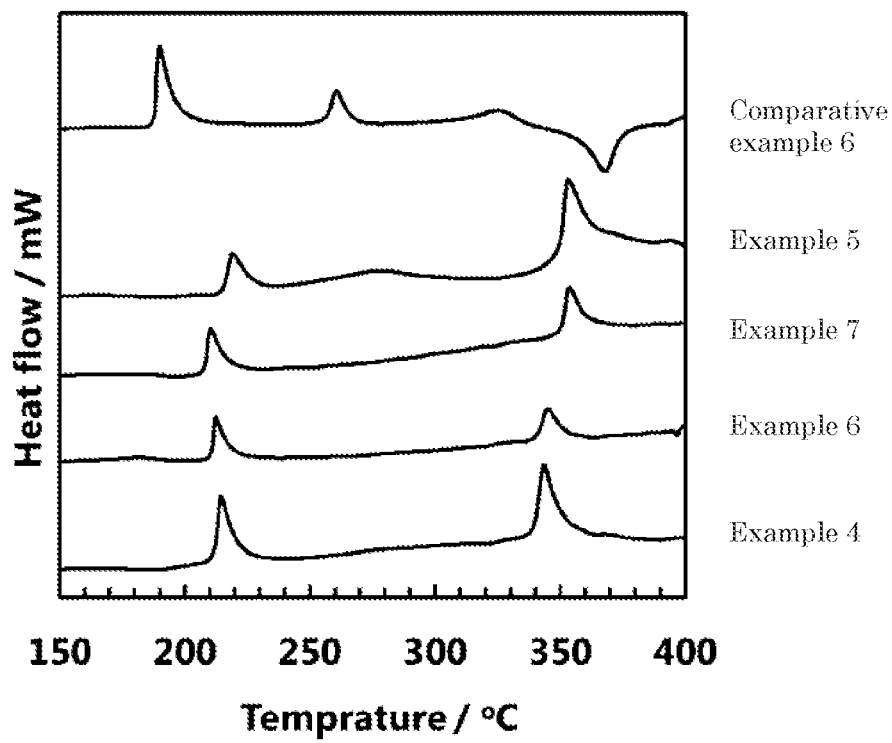
FIG. 5 shows DSC curves of intermediates after a milling treatment and before a heat treatment for sulfide solid electrolytes according to examples and a comparative example.
Figure 6:
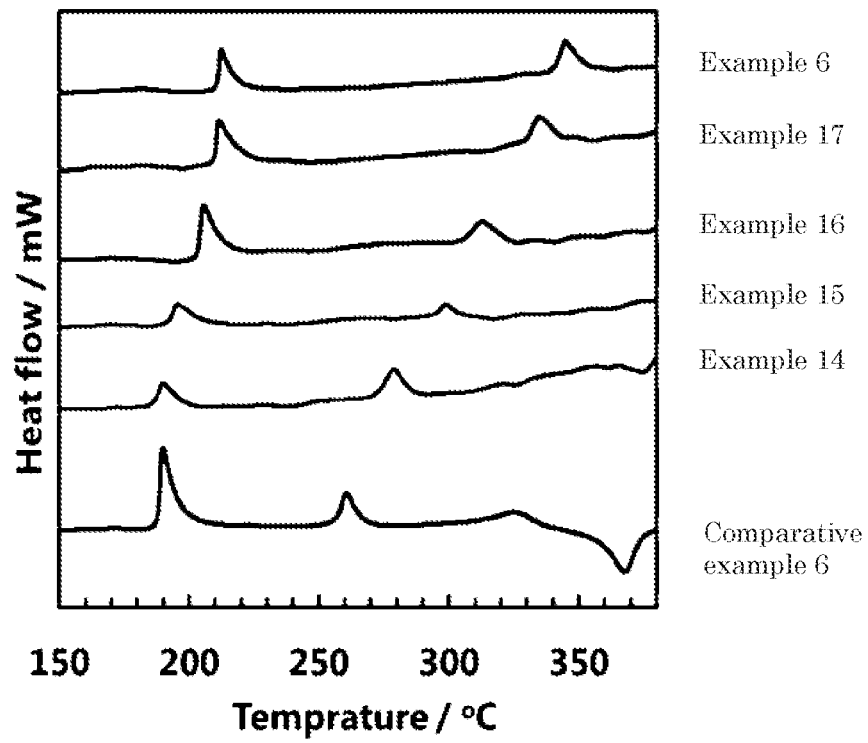
FIG. 6 shows DSC curves of intermediates after a milling treatment and before a heat treatment for sulfide solid electrolytes according to examples and a comparative example.

For the sulfide solid electrolytes according to Examples 4 to 7, Examples 14 to 17, and Comparative Example 6, the intermediates after the milling treatment and before the heat treatment were subjected to the DSC measurement. FIGS. 5 and 6 show the DSC curves for these samples.

TABLE 6

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 3 | $Li_{3/2}Al_{1/2}N$ | Br | I | 0.70 | 0.20 | 10 | 5 | $Li_{3.33}PAl_{0.21}S_{3.67}N_{0.42}Br_{0.25}I_{0.12}$ | 245 | HICP | 4.2 | 27 |
| Comparative Example 4 | — | Br | I | 0.75 | — | 10 | 5 | $Li_{3.35}PS_4Br_{0.24}I_{0.12}$ | 225 | β-$Li_3PS_4$ + LICP | 0.091 | 35 |
| Comparative Example 5 | $Li_3N$ | Br | I | 0.75 | 0.02 | 10 | 5 | $Li_{3.35}PS_{3.94}N_{0.04}Br_{0.24}I_{0.12}$ | 225 | β-$Li_3PS_4$ + HICP + LICP | 1.5 | 29 |

TABLE 7

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 4 | $Li_{3/2}Al_{1/2}N$ | Br | I | 0.70 | 0.20 | 12 | 8 | $Li_{3.48}PAl_{0.21}S_{3.67}N_{0.42}Br_{0.31}I_{0.21}$ | 255 | HICP | 4.7 | 25 |
| Example 5 | $Li_{3/2}Al_{1/2}N$ | Br | I | 0.67 | 0.30 | 12 | 8 | $Li_{3.55}PAl_{0.32}S_{3.52}N_{0.65}Br_{0.32}I_{0.22}$ | 275 | HICP + Specific Crystalline Structure C | 3.0 | 26 |
| Example 6 | $Li_{3/2}B_{1/2}N$ | Br | I | 0.70 | 0.20 | 12 | 8 | $Li_{3.48}PB_{0.21}S_{3.67}N_{0.42}Br_{0.31}I_{0.21}$ | 270 | HICP + Specific Crystalline Structure C | 4.5 | 27 |
| Example 7 | $Li_{5/3}Si_{1/3}N$ | Br | I | 0.70 | 0.20 | 12 | 8 | $Li_{3.55}PSi_{0.14}S_{3.67}N_{0.42}Br_{0.31}I_{0.21}$ | 270 | HICP + Specific Crystalline Structure C | 2.5 | 25 |
| Comparative Example 6 | $Li_3N$ | Br | I | 0.75 | 0.035 | 12 | 8 | $Li_{3.50}PS_{3.90}N_{0.07}Br_{0.30}I_{0.20}$ | 250 | β-$Li_3PS_4$ + LICP | 0.15 | 35 |

TABLE 8

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 8 | $Li_{3/2}Al_{1/2}N$ | Br | I | 0.70 | 0.20 | 15 | 10 | $Li_{3.65}PAl_{0.21}S_{3.67}N_{0.42}Br_{0.42}I_{0.28}$ | 215 | HICP + LICP | 5.0 | 25 |
| Comparative Example 7 | $Li_3N$ | Br | I | 0.75 | 0.02 | 15 | 10 | $Li_{3.67}PS_{3.94}N_{0.04}Br_{0.40}I_{0.27}$ | 195 | HICP + LICP | 4.2 | 26 |

TABLE 9

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 9 | $Li_{3/2}Al_{1/2}N$ | Br | — | 0.70 | 0.20 | 10 | — | $Li_{3.19}PAl_{0.21}S_{3.67}N_{0.42}Br_{0.23}$ | 265 | HICP | 3.1 | 28 |
| Example 10 | $Li_{3/2}Al_{1/2}N$ | Br | — | 0.70 | 0.20 | 20 | — | $Li_{3.48}PAl_{0.21}S_{3.67}N_{0.42}Br_{0.52}$ | 250 | HICP + LiBr | 3.3 | 26 |

TABLE 9-continued

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 11 | $Li_{3/2}Al_{1/2}N$ | Br | — | 0.70 | 0.20 | 30 | — | $Li_{3.85}PAl_{0.21}S_{3.67}N_{0.42}Br_{0.89}$ | 240 | HICP + LiBr | 2.9 | 26 |
| Comparative Example 8 | $Li_3N$ | Br | — | 0.75 | 0.02 | 10 | — | $Li_{3.22}PS_{3.94}N_{0.04}Br_{0.22}$ | 225 | β-$Li_3PS_4$ | 0.12 | 36 |

TABLE 10

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 12 | $Li_{3/2}Al_{1/2}N$ | I | — | 0.70 | 0.20 | 10 | — | $Li_{3.19}PAl_{0.21}S_{3.67}N_{0.42}I_{0.23}$ | 255 | HICP + LICP | 3.0 | 27 |
| Example 13 | $Li_{3/2}Al_{1/2}N$ | I | — | 0.70 | 0.20 | 20 | — | $Li_{3.48}PAl_{0.21}S_{3.67}N_{0.42}I_{0.52}$ | 240 | HICP + LICP | 1.7 | 28 |

TABLE 11

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Comparative Example 6 | $Li_3N$ | Br | I | 0.6975 | 0.035 | 12 | 8 | $Li_{3.50}PS_{3.90}N_{0.07}Br_{0.30}I_{0.20}$ | 250 | β-$Li_3PS_4$ + LICP | 0.15 | 35 |
| Example 14 | $Li_{3/2}B_{1/2}N$ | Br | I | 0.745 | 0.030 | 12 | 8 | $Li_{3.52}PB_{0.03}S_{3.96}N_{0.06}Br_{0.30}I_{0.20}$ | 250 | β-$Li_3PS_4$ + LICP | 0.13 | 35 |
| Example 15 | $Li_{3/2}B_{1/2}N$ | Br | I | 0.74 | 0.050 | 12 | 8 | $Li_{3.50}PB_{0.05}S_{3.92}N_{0.10}Br_{0.30}I_{0.20}$ | 250 | HICP + β-$Li_3PS_4$ + LICP | 1.2 | 28 |
| Example 16 | $Li_{3/2}B_{1/2}N$ | Br | I | 0.73 | 0.10 | 12 | 8 | $Li_{3.53}PB_{0.10}S_{3.85}N_{0.21}Br_{0.31}I_{0.21}$ | 250 | HICP | 4.8 | 26 |
| Example 17 | $Li_{3/2}B_{1/2}N$ | Br | I | 0.715 | 0.15 | 12 | 8 | $Li_{3.49}PB_{0.15}S_{3.75}N_{0.31}Br_{0.31}I_{0.21}$ | 250 | HICP | 5.7 | 26 |
| Example 6 | $Li_{3/2}B_{1/2}N$ | Br | I | 0.70 | 0.20 | 12 | 8 | $Li_{3.48}PB_{0.21}S_{3.67}N_{0.42}Br_{0.31}I_{0.21}$ | 270 | HICP + Specific Crystalline Structure C | 4.5 | 27 |

TABLE 12

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 6 | $Li_{3/2}B_{1/2}N$ | Br | I | 0.70 | 0.20 | 12 | 8 | $Li_{3.48}PB_{0.21}S_{3.67}N_{0.42}Br_{0.31}I_{0.21}$ | 270 | HICP + Specific Crystalline Structure C | 4.5 | 27 |
| Example 18 | $Li_{3/2}B_{1/2}N$ | Br | I | 0.70 | 0.20 | 15 | 10 | $Li_{3.65}PB_{0.21}S_{3.67}N_{0.42}Br_{0.42}I_{0.28}$ | 230 | HICP | 4.4 | 26 |
| Example 19 | $Li_{3/2}B_{1/2}N$ | Br | I | 0.70 | 0.20 | 17 | 13 | $Li_{3.85}PB_{0.21}S_{3.67}N_{0.42}Br_{0.51}I_{0.39}$ | 195 | HICP + Unknown | 3.9 | 26 |

TABLE 12-continued

| | $Li_\alpha M_\beta N$, $X_1$, $X_2$, x, y, $z_1$, and $z_2$ in General Formula | | | | | | | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|---|---|---|---|---|---|---|
| | $Li_\alpha M_\beta N$ | $X_1$ | $X_2$ | x | y | $z_1$ | $z_2$ | | | | | |
| Example 20 | $Li_{3/2}B_{1/2}N$ | Br | I | 0.70 | 0.20 | 20 | 15 | $Li_{4.08}PB_{0.21}S_{3.67}N_{0.42}Br_{0.64}I_{0.48}$ | 185 | HICP + Unknown | 2.8 | 26 |

TABLE 13

| | Chemical Compositional Ratio | Heat Treatment Temperature/ °C. | Crystalline Structure derived from XRD Pattern | $\sigma_{25}$/ mS cm$^{-1}$ | $E_a$/ kJ mol$^{-1}$ |
|---|---|---|---|---|---|
| Example 4-1 | $Li_{3.48}PAl_{0.21}S_{3.67}N_{0.42}Br_{0.31}I_{0.21}$ | 215 | HICP | 4.5 | 25 |
| Example 4-2 | ↑ | 230 | HICP | 4.5 | 26 |
| Example 4-3 | ↑ | 255 | HICP | 4.7 | 25 |
| Example 4-4 | ↑ | 275 | HICP | 4.2 | 25 |
| Example 4-5 | ↑ | 290 | HICP + Specific Crystalline Structure C | 3.6 | 26 |
| Example 4-6 | ↑ | 310 | $\beta$-$Li_3PS_4$ + LICP + Specific Crystalline Structure C | 0.17 | 33 |
| Example 5-1 | $Li_{3.55}PAl_{0.32}S_{3.52}N_{0.65}Br_{0.32}I_{0.22}$ | 235 | HICP | 3.3 | 25 |
| Example 5-2 | ↑ | 275 | HICP + Specific Crystalline Structure C | 3.0 | 26 |
| Example 5-3 | ↑ | 290 | HICP + Specific Crystalline Structure C | — | — |
| Example 5-4 | ↑ | 310 | HICP + Specific Crystalline Structure C | 4.2 | 25 |
| Example 5-5 | ↑ | 330 | HICP + $\beta$-$Li_3PS_4$ + Specific Crystalline Structure C | 0.13 | 32 |
| Example 6-1 | $Li_{3.48}PB_{0.21}S_{3.67}N_{0.42}Br_{0.31}I_{0.21}$ | 230 | HICP | 4.6 | 26 |
| Example 6-2 | ↑ | 270 | HICP + Specific Crystalline Structure C | 4.5 | 27 |
| Example 6-3 | ↑ | 290 | HICP + Specific Crystalline Structure C | 3.8 | 27 |
| Example 6-4 | ↑ | 310 | HICP + Specific Crystalline Structure C | 3.3 | 27 |
| Example 6-5 | ↑ | 330 | HICP + $\beta$-$Li_3PS_4$ + Specific Crystalline Structure C | 1.2 | 27 |
| Example 7-1 | $Li_{3.55}PSi_{0.14}S_{3.67}N_{0.42}Br_{0.31}I_{0.21}$ | 230 | HICP | 4.7 | 26 |
| Example 7-2 | ↑ | 270 | HICP + Specific Crystalline Structure C | 4.5 | 25 |
| Example 7-3 | ↑ | 290 | HICP + Specific Crystalline Structure C | 3.7 | 27 |
| Example 7-4 | ↑ | 310 | HICP + Specific Crystalline Structure C | 3.1 | 27 |
| Example 7-5 | ↑ | 330 | HICP + $\beta$-$Li_3PS_4$ + LICP + Specific Crystalline Structure C | 0.35 | 32 |
| Comparative Example 6-1 | $Li_{3.50}PS_{3.90}N_{0.07}Br_{0.30}I_{0.20}$ | 210 | HICP | 5.0 | 26 |
| Comparative Example 6-2 | ↑ | 230 | HICP | 6.2 | 25 |
| Comparative Example 6-3 | ↑ | 250 | $\beta$-$Li_3PS_4$ + LICP | 0.15 | 35 |

From Table 6, it is determined that the sulfide solid electrolytes according to Comparative Example 4 and Comparative Example 5 each have an LICP produced and undergo a decrease in ion conductivity at 25° C. in the case of the heat treatment temperature of 225° C. In contrast, it is determined that the sulfide solid electrolyte according to Example 3 containing Li, P, S, N, Br, I, and Al has no LICP produced and shows a high ion conductivity, in spite of the heat treatment at a higher temperature than that for the sulfide solid electrolytes according to Comparative Example 4 and Comparative Example 5. More specifically, it can be understood that the lower limit of the heat treatment temperature at which the ion conductivity is decreased is increased for the sulfide solid electrolyte according to Example 3 as compared with the sulfide solid electrolytes according to Comparative Example 4 and Comparative Example 5.

From Table 7, it is determined that the sulfide solid electrolytes according to Examples 4 to 7 have no LICP produced and show high ion conductivities, in spite of the heat treatment at higher temperatures than that for the sulfide solid electrolyte according to Comparative Example 6. More specifically, it can be understood that the lower limit of the heat treatment temperature at which the ion conductivity is decreased is increased for the sulfide solid electrolytes according to Examples 4 to 7 as compared with the sulfide solid electrolyte according to Comparative Example 6.

From Table 8, it is determined that the sulfide solid electrolyte according to Example 8 shows a high ion conductivity, in spite of the heat treatment at a higher temperature than that for the sulfide solid electrolyte according to Comparative Example 7. More specifically, it can be understood that the lower limit of the heat treatment temperature at which the ion conductivity is decreased is increased for the sulfide solid electrolyte according to Example 8 as compared with the sulfide solid electrolyte according to Comparative Example 7. This is believed to be because the phase transition of HICP to LICP was suppressed in the sulfide solid electrolyte according to Example 8.

From Table 9, it is determined that the sulfide solid electrolytes according to Examples 9 to 11 shows high ion conductivities, each in spite of the heat treatment at a higher temperature than that for the sulfide solid electrolyte according to Comparative Example 8. Furthermore, it is determined that the effect of the present invention for improving the thermal stability of the high Li-ion conductive phase in the sulfide solid electrolyte is achieved even in the case where the sulfide solid electrolyte contains only Br as the element X.

Further, the comparison between Example 9 and Comparative Example 8 with the same content of Br determines that Comparative Example 8 has no HICP or LICP produced, whereas Example 9 has an HICP produced. More specifically, the effect of being capable of producing an HICP with a lower content of element X is recognized in the case where the sulfide solid electrolyte contains Li, P, S, N, the element X, and element M than in the case of containing no element M.

From Table 10, it is determined that a sulfide solid electrolyte including an HICP is obtained even in the case where the sulfide solid electrolyte contains only I as the element X.

From Table 11, it is determined that the sulfide solid electrolytes according to Example 6 and Examples 15 to 17 have HICPs observed and show high ion conductivities, in spite of the heat treatment at temperatures equal to or higher than that for the sulfide solid electrolyte according to Comparative Example 6. More specifically, it can be understood that the lower limit of the heat treatment temperature at which the ion conductivity is decreased is increased for the sulfide solid electrolytes these examples as compared with the sulfide solid electrolyte according to Comparative Example 6.

Furthermore, from FIG. 6, it is determined that the sulfide solid electrolytes according to Examples 6 and 14 to 17 have larger differences in temperature between the crystallization peak presumed to be derived from the HICP and the crystallization peak derived from $\beta$-Li$_3$PS$_4$ than the sulfide solid electrolyte according to Comparative Example 6. For example, the crystallization peak presumed to be derived from the HICP and the crystallization peak derived from $\beta$-Li$_3$PS$_4$ were respectively observed at around 190° C. and 260° C. in Comparative Example 6, whereas the peaks were respectively observed around 190° C. and 280° C. in Example 14. From the foregoing, it can be understood that the sulfide solid electrolyte according to the examples widens the temperature range for the stable presence of the HICP, thereby improving the thermal stability of the high Li-ion conductive phase.

It is to be noted that the crystallization peak presumed to be derived from the HICP in FIG. 6 refers to a peak observed in the range of approximately 180° C. to 220° C. The crystallization peaks derived from $\beta$-Li$_3$PS$_4$ in FIG. 6 refer to the peaks observed respectively around 345° C., around 280° C., around 300° C., around 310° C., around 335° C., and around 260° C. in Example 6, Examples 14 to 16, and Comparative Example 6.

From the foregoing, it is determined that the effect of improving the thermal stability of the high Li-ion conductive phase is achieved even in the case where the content ratio N/P of N to P in the sulfide solid electrolyte is 0.060, 0.10, 0.21, 0.31, or 0.42.

From Table 12, it is determined that a sulfide solid electrolyte containing an HICP is obtained even in the case where the content ratio X/P of the element X to P in the sulfide solid electrolyte is 0.52, 0.70, 0.90, or 1.12.

From Comparative Examples 6-1 to 6-3 shown in Table 13, it is determined that the sulfide solid electrolyte according to Comparative Example 6 undergoes a phase transition from the HICP to an HICP and $\beta$-Li$_3$PS$_4$ at the heat treatment temperature of 250° C. or higher. Furthermore, it is determined that the ion conductivity at 25° C. is significantly reduced accordingly.

In contrast, from Examples 4-1 to 4-6, it is determined that in the sulfide solid electrolyte according to Example 4 has an HICP even when the heat treatment temperature is raised to 290° C., thereby allowing a high ionic conductivity to be maintained.

In addition, from Examples 5-1 to 5-5, it is determined that even the sulfide solid electrolyte according Example 5 has an HICP in a wide range of temperature, thereby allowing a high ion conductivity to be maintained.

Furthermore, from Examples 6-1 to 6-5 and Examples 7-1 to 7-5, it is determined that the effect of the present invention capable of maintaining a high ion conductivity in a wide range of temperature is achieved, even in the case of containing B and Si as the element M instead of Al.

More specifically, from Table 13, it can be understood that the sulfide solid electrolytes according to Examples 4 to 7 widen the range of the heat treatment temperature in which the ion conductivity is not decreased.

In addition, from the comparison between Examples 6 and 7 and Examples 4 and 5 in Table 13, it is determined that in the case where the sulfide solid electrolyte contains any of Si and B as the element M, the range of the heat treatment temperature in which the ion conductivity is not decreased has a range of at least 80° C., and the high Li-ion conductive phase shows particularly excellent thermal stability. It is to be noted that the peaks around 210° C. in the DSC curves of Examples 6 and 7 in FIG. 5 refer to crystallization peaks presumed to be derived from HICPs. Thus, according to Example 6 and Example 7, the range of heat treatment temperature in which the ion conductivity is not decreased can also be presumed to have a range of 100° C. The reason why such these results were obtained is not known exactly, but for example, it is conceivable that the strength of the binding energy between either Si or B and N had a value suitable for producing the effect of the present invention.

As is clear from Tables 6 to 13, it has been confirmed that the sulfide solid electrolytes according to the examples increase the lower limit of the heat treatment temperature at which the ion conductivity is decreased, thereby widening the range of heat treatment temperature in which the ion conductivity is not decreased. More specifically; the sulfide solid electrolyte containing Li, P, S, N, the element X, and the element M was excellent in the thermal stability of the HICP. This is believed to be because the discharge of N to the outside of the system in the process of the production was suppressed, thereby sufficiently producing the effect of improving the thermal stability by the sulfide solid electrolyte containing N.

It is suggested that the method for producing a sulfide solid electrolyte according to an embodiment of the present invention is capable of suppressing the discharge of N to the outside of the system, and additionally suppressing the precipitation of $Li_2S$. Preferably, the precipitation of $Li_2S$ can be suppressed, thereby allowing an improvement in the atmospheric stability of the sulfide solid electrolyte.

More specifically, from Examples 21 to 41, Comparative Example 9, and Comparative Example 10, it is suggested that the method for producing a sulfide solid electrolyte according to an embodiment of the present invention is capable of suppressing the precipitation of $Li_2S$.

Example 21

A sulfide solid electrolyte with the $Li_\alpha M_\beta N$ being $Li_{3/2}Al_{1/2}N$, z=1, and, y=0.70 in the compositional formula $(100-z)(yLi_2S\cdot(1-y)P_2S_5)\cdot zLi_\alpha M_\beta N$, that is, $99(0.7Li_2S\cdot 0.3P_2S_5)\cdot 1Li_{3/2}Al_{1/2}N$ was synthesized by the following treatment.

$Li_3N$ and AlN were weighed so as to be 1.2:1 in terms of mole ratio, mixed in a mortar, and then pelletized. Next, $Li_{3/2}Al_{1/2}N$ was prepared by heat treatment at 750° C. for 1 hour.

Next, in a glove box in an argon atmosphere with a dew point of −50° C. or lower, $Li_2S$ (99.98%, Aldrich), $P_2S_5$ (99%, Aldrich), and $Li_{3/2}Al_{1/2}N$ were weighed so as to be 69.3:29.7:1.0 in terms of mole ratio, and then mixed in a mortar. This mixed sample was put in a hermetically sealed 80 mL zirconia pot containing 160 g of zirconia balls with a diameter of 4 mm. The sample was subjected to milling for 45 hours at a revolution speed of 510 rpm with a planetary ball mill (from FRITSCH, model number: Premium line P-7). The milled sample was subjected to a heat treatment for 2 hours to obtain a sulfide solid electrolyte according to Example 1. This heat treatment was performed at a temperature that was equal to or higher than the crystallization temperature and equal to or lower than the crystallization temperature plus 100° C. The crystallization temperature was determined by measuring the DSC. The DSC measurement was made under the following conditions. More specifically, the temperature was raised from room temperature to 400° C. at 10° C./min with the use of a DSC device (Thermo Plus DSC8230 from Rigaku Corporation) and a hermetically sealed pan made of SUS.

Examples 22 to 29

Sulfide solid electrolytes according to Examples 22 to 29 were synthesized similarly to Example 21 except that the value of z in the compositional formula $(100-z)(yLi_2S\cdot(1-y)P_2S_5)\cdot zLi_\alpha M_\beta N$ of the sulfide solid electrolyte was changed to 5, 7, 10, 15, 20, 25, 30, and 40.

Examples 30 to 32

Sulfide solid electrolytes according to Examples 30 to 32 were synthesized similarly to Example 21 except for changing the value of z respectively to 20, 25, and 30 with y=0.67 in the compositional formula $(1.00-z)(yLi_2S\cdot(1-y)P_2S_5)\cdot zLi_\alpha M_\beta N$ of the sulfide solid electrolyte.

Examples 33 to 36

$Li_3N$ and BN were weighed so as to be 1.1:1 in terms of mole ratio, mixed in a mortar, then pelletized, and then subjected to a heat treatment at 800° C. for 10 minutes to prepare $Li_{3/2}B_{1/2}N$. For the prepared. $Li_{3/2}B_{1/2}N$, it was confirmed by XRD measurement that the main phase was $Li_{3/2}B_{1/2}N$.

Sulfide solid electrolytes according to Examples 33 to 36 were synthesized similarly to Example 21 except for changing $Li_\alpha M_\beta N$ to $Li_{3/2}B_{1/2}N$ and changing the value of z respectively to 1, 10, 20, and 30 in the compositional formula $(100-z)(yLi_2S\cdot(1-y)P_2S_5)\cdot zLi_\alpha M_\beta N$ of the sulfide solid electrolyte.

Examples 37 to 41

$Li_3N$ and $Si_3N_4$ were weighed so as to be 5.1:1 in terms of mole ratio, mixed in a mortar, then pelletized, and then subjected to a heat treatment at 800° C. for 10 minutes to prepare $Li_{5/3}Si_{1/3}N$. For the prepared $Li_{5/3}Si_{1/3}N$, it was confirmed by XRD measurement that the main phase was $Li_{5/3}Si_{1/3}N$.

Sulfide solid electrolytes according to Examples 37 to 41 were synthesized similarly to Example 21 except for changing $Li_\alpha M_\beta N$ to $Li_{5/3}Si_{1/3}N$ and changing the value of z respectively to 1.5, 15, 20, 30, and 45 in the compositional formula $(100-z)(yLi_2S\cdot(1-y)P_2S_5)\cdot zLi_\alpha M_\beta N$ of the sulfide solid electrolyte.

Comparative Example 9

A sulfide solid electrolyte according to Comparative Example 9 was synthesized similarly to Example 21 except for changing $Li_\alpha M_\beta N$ to $Li_3N$ and changing the value of z to 20 in the compositional formula $(100-z)(yLi_2S\cdot(1-y)P_2S_5)\cdot zLi_\alpha M_\beta N$ of the sulfide solid electrolyte.

Comparative Example 10

A sulfide solid electrolyte according to Comparative Example 10 was synthesized similarly to Comparative Example 9 except for changing the value of z to 16 with y=0.68 in the compositional formula $(100-z)(yLi_2S\cdot(1-y)P_2S_5)\cdot zLi_\alpha M_\beta N$ of the sulfide solid electrolyte.

[Evaluation]
(1) XRD, Ion Conductivity (σ)

X-ray diffraction measurement was made by the method described above. In addition, the ion conductivity ($\sigma_{25}$) at 25° C. was determined by measuring the alternating-current impedance with the use of "VMP-300" from (Bio-Logic) in accordance with the method described above.
(2) Raman Spectroscopic Analysis Raman spectra were measured by the following method. With the use of a laser Raman spectrophotometer ("LabRAM FIR Revolution" manufactured by Horiba, Ltd.), Raman spectrometry was performed in the wave number range of 100 $cm^{-1}$ to 1800 $cm^{-1}$ under the conditions of excitation laser wavelength: 532 nm (YAG laser) and grating 600 gr/mm.

Table 14 shows the ion conductivities at 25° C., the crystalline structures identified from the XRD patterns, and the Raman spectra for Examples 21 to 41, Comparative Example 9, and Comparative Example 10. It is to be noted that the "specific crystalline structure A" in the table represents a crystal phase that has diffraction peak at $2\theta=17.9°\pm0.5°$, $19.1°\pm0.5°$, $29.1°\pm0.5°$, $29.8°\pm0.5°$ and 30.9°±0.5° in X-ray diffraction measurement with a CuKα line. The "specific crystalline structure B" therein represents a crystal phase that has diffraction peaks at 2θ=17.9°±0.5°, 19.1°±0.5°, 29.1°±0.5°, and 29.8°±0.5° in X-ray diffraction measurement with a CuKα line. "-" Indicates no measurement made.

Although the sulfide solid electrolyte tends to have $Li_2S$ precipitated in the case of a higher content of Li, the results were obtained as mentioned above, and it has been thus suggested that the precipitation of $Li_2S$ is suppressed in the method for producing the sulfide solid electrolytes according to the examples.

TABLE 14

| | $Li_\alpha M_\beta N$, y, and z in Compositional Formula $(100 - z)(yLi_2S \cdot (1 - y)P_2S_5 \cdot zLi_\alpha M_\beta N)$ | | | Content Ratio to Phosphorus (mole ratio) | | Crystalline Structure derived from XRD | Molecular Structure derived from Raman | Ion Conductivity $\sigma_{25}$ |
|---|---|---|---|---|---|---|---|---|
| | $Li_\alpha M_\beta N$ | z | y | Lithium | Nitrogen | Spectrum | Spectrum | (S/cm) |
| Example 21 | $Li_{3/2}Al_{1/2}N$ | 1 | 0.70 | 2.36 | 0.02 | $Li_7P_3S_{11}$ | — | $2.6 \times 10^{-3}$ |
| Example 22 | $Li_{3/2}Al_{1/2}N$ | 5 | 0.70 | 2.46 | 0.09 | $Li_7P_3S_{11}$ | $PS_4^{3-} + P_2S_7^{4-} + P_2S_6^{4-}$ | $1.6 \times 10^{-3}$ |
| Example 23 | $Li_{3/2}Al_{1/2}N$ | 7 | 0.70 | 2.52 | 0.13 | $\beta$-$Li_3PS_4$ | $PS_4^{3-} + P_2S_7^{4-} + P_2S_6^{4-}$ | $0.6 \times 10^{-3}$ |
| Example 24 | $Li_{3/2}Al_{1/2}N$ | 10 | 0.70 | 2.61 | 0.19 | Specific Crystalline Structure A | $PS_4^{3-} + P_2S_7^{4-} + P_2S_6^{4-}$ | $1.1 \times 10^{-3}$ |
| Example 25 | $Li_{3/2}Al_{1/2}N$ | 15 | 0.70 | 2.77 | 0.29 | Specific Crystalline Structure A | $PS_4^{3-}$ | $1.6 \times 10^{-3}$ |
| Example 26 | $Li_{3/2}Al_{1/2}N$ | 20 | 0.70 | 2.96 | 0.42 | Specific Crystalline Structure A | $PS_4^{3-}$ | $1.7 \times 10^{-3}$ |
| Example 27 | $Li_{3/2}Al_{1/2}N$ | 25 | 0.70 | 3.17 | 0.56 | Specific Crystalline Structure A + $Li_{3/2}Al_{1/2}N$ | — | $1.6 \times 10^{-3}$ |
| Example 28 | $Li_{3/2}Al_{1/2}N$ | 30 | 0.70 | 3.40 | 0.71 | Specific Crystalline Structure A + $Li_{3/2}Al_{1/2}N$ | — | $1.0 \times 10^{-3}$ |
| Example 29 | $Li_{3/2}Al_{1/2}N$ | 40 | 0.70 | 4.00 | 1.11 | Specific Crystalline Structure A | — | $0.4 \times 10^{-3}$ |
| Example 30 | $Li_{3/2}Al_{1/2}N$ | 20 | 0.67 | 2.60 | 0.38 | Specific Crystalline Structure A | — | $1.1 \times 10^{-3}$ |
| Example 31 | $Li_{3/2}Al_{1/2}N$ | 25 | 0.67 | 2.79 | 0.51 | Specific Crystalline Structure A | — | $1.2 \times 10^{-3}$ |
| Example 32 | $Li_{3/2}Al_{1/2}N$ | 30 | 0.67 | 3.00 | 0.65 | Specific Crystalline Structure B | — | $1.1 \times 10^{-3}$ |
| Example 33 | $Li_{3/2}B_{1/2}N$ | 1 | 0.70 | 2.36 | 0.02 | $Li_7P_3S_{11}$ | — | $1.4 \times 10^{-3}$ |
| Example 34 | $Li_{3/2}B_{1/2}N$ | 10 | 0.70 | 2.61 | 0.19 | $Li_7P_3S_{11}$ + Specific Crystalline Structure A | $PS_4^{8-} + P_2S_7^{4-}$ | $1.0 \times 10^{-3}$ |
| Example 35 | $Li_{3/2}B_{1/2}N$ | 20 | 0.70 | 2.96 | 0.42 | Specific Crystalline Structure A | $PS_4^{3-}$ | $1.5 \times 10^{-3}$ |
| Example 36 | $Li_{3/2}B_{1/2}N$ | 30 | 0.70 | 3.40 | 0.71 | Specific Crystalline Structure A + $Li_2S$ | $PS_4^{3-}$ | $0.8 \times 10^{-3}$ |
| Example 37 | $Li_{5/3}Si_{1/3}N$ | 1.5 | 0.70 | 2.38 | 0.03 | $Li_7P_3S_{11}$ | $PS_4^{3-} + P_2S_7^{4-} + P_2S_6^{4-}$ | $2.0 \times 10^{-3}$ |
| Example 38 | $Li_{5/3}Si_{1/3}N$ | 15 | 0.70 | 2.80 | 0.28 | Specific Crystalline Structure A | — | $1.1 \times 10^{-3}$ |
| Example 39 | $Li_{5/3}Si_{1/3}N$ | 20 | 0.70 | 3.03 | 0.42 | Specific Crystalline Structure A | — | $1.8 \times 10^{-3}$ |
| Example 40 | $Li_{5/3}Si_{1/3}N$ | 30 | 0.70 | 3.38 | 0.63 | Specific Crystalline Structure A | — | $1.4 \times 10^{-3}$ |
| Example 41 | $Li_{5/3}Si_{1/3}N$ | 45 | 0.70 | 4.12 | 1.07 | Specific Crystalline Structure A + $Li_2S$ | — | $0.5 \times 10^{-3}$ |
| Comparative Example 9 | $Li_3N$ | 20 | 0.70 | 3.58 | 0.42 | $Li_2S$ | — | $0.4 \times 10^{-3}$ |
| Comparative Example 10 | $Li_3N$ | 16 | 0.68 | 3.00 | 0.30 | Specific Crystalline Structure A + $Li_2S$ | — | — |

The sulfide solid electrolyte according to Comparative Example 9 has only an observed peak derived from the crystalline structure of $Li_2S$. From this result, it is determined that the use of $Li_3N$ makes $Li_2S$ more likely to be precipitated.

The reason why this result was obtained is not known exactly, but this is believed to be because $Li_3N$ and the other raw material compounds react dramatically to precipitate $Li_2S$.

Examples 21 to 35 and 37 to 40 have no peak of $Li_2S$ observed. Above all, from the comparison among the examples (Examples 26, 35, and 39, and Comparative Example 9) with z=20 and y=0.70, it has been confirmed that the precipitation of $Li_2S$ is suppressed in the sulfide solid electrolytes according to the examples.

In addition, the sulfide solid electrolytes according to Examples 27 to 29, 32, 39, and 40 have no peak of $Li_2S$ observed, in spite of their higher content ratios Li/P of Li to P than that of the sulfide solid electrolyte according to Comparative Example 10. In particular, Example 29 has no peak of $Li_2S$ observed in spite of the fact that the content ratio of Li to P is 4.00, which is higher than those of Comparative Example 9 and Comparative Example 1.0. The sulfide solid electrolytes according to Examples 26 and 35 have no peak of $Li_2S$ observed in spite of substantially the same UN as that of the sulfide solid electrolyte according to Comparative Example 10.

The sulfide solid electrolyte according to Example 32 has no peak of $Li_2S$ observed in spite of substantially the same value of y as and the same Li/P as those of Comparative Example 10, More specifically, from the comparison among Example 28, Example 29, Example 36, Example 40, and Example 41, it has been suggested that the precipitation of $Li_2S$ is remarkably suppressed in the case of containing Al as the element M.

From the foregoing, it has been suggested that, the precipitation of $Li_2S$ is suppressed in the method for producing the sulfide solid electrolytes according to the examples. The reason why the precipitation of $Li_2S$ can be inhibited by containing the element M in the sulfide solid electrolyte is considered as follows. In the case of using $Li_3N$ as a starting material for the sulfide-based solid electrolyte containing N, $Li_3N$ and $P_2S_5$ react dramatically to release $N_2$, thereby resulting in precipitation of $Li_2S$. This is believed to be because of the low N defect generation energy of $Li_3N$. In contrast, according to the invention of the present application, because the N defect generation energy of $Li_\alpha M_\beta N$ is higher than the N defect generation energy of $Li_3N$, the reaction proceeds slowly in the process of synthesizing the sulfide-based solid electrolyte, thereby inhibiting the release of $N_2$ and the precipitation of $Li_2S$.

Although the present invention has been described in detail above, the above-described embodiments are considered by way of example only, and the invention disclosed herein encompasses various modifications and changes made to the above-described specific examples.

INDUSTRIAL APPLICABILITY

The all-solid-state battery including the sulfide solid electrolyte according to the present invention is suitably used as, for example, a lithium-ion all-solid-state battery for HEVS.

DESCRIPTION OF REFERENCE SIGNS

1: Negative electrode layer
2: Positive electrode layer
3: Solid electrolyte layer
4: Negative electrode substrate layer
5: Negative composite layer
6: Positive composite layer
7: Positive electrode substrate layer
10: All-solid-state battery

The invention claimed is:

1. A crystalline sulfide solid electrolyte comprising Li, P, S, N, and an element M, and having a crystalline structure, wherein
   M represents at least one element selected from the group consisting of Al, B, and Si.

2. The sulfide solid electrolyte according to claim 1, further comprising an element X,
   wherein X represents at least one element selected from the group consisting of Cl, Br, and I.

3. The sulfide solid electrolyte according to claim 2, wherein the crystalline structure has diffraction peaks at $2\theta=20.2°\pm0.5°$ and $23.6°\pm0.5°$ in X-ray diffraction measurement with a CuKα line.

4. An all-solid-state battery comprising the sulfide solid electrolyte according to claim 1.

* * * * *